US012644971B2

(12) United States Patent
Assmann

(10) Patent No.: US 12,644,971 B2
(45) Date of Patent: Jun. 2, 2026

(54) TIME-OF-FLIGHT HISTOGRAM SUPER-RESOLUTION SHAPE FITTING

(71) Applicant: STMicroelectronics International N.V., Geneva (CH)

(72) Inventor: Andreas Assmann, Edinburgh (GB)

(73) Assignee: STMicroelectronics International N.V., Geneva (CH)

( * ) Notice: Subject to any disclaimer, the term of this patent is extended or adjusted under 35 U.S.C. 154(b) by 488 days.

(21) Appl. No.: 18/304,589

(22) Filed: Apr. 21, 2023

(65) Prior Publication Data

US 2024/0353538 A1 Oct. 24, 2024

(51) Int. Cl.
*G01S 7/4865* (2020.01)
*G01S 17/894* (2020.01)

(52) U.S. Cl.
CPC .......... *G01S 7/4865* (2013.01); *G01S 17/894* (2020.01)

(58) Field of Classification Search
CPC ........ G01S 17/10; G01S 7/4865; G01S 17/89; G01S 7/4972; G01S 17/894
See application file for complete search history.

(56) References Cited

U.S. PATENT DOCUMENTS

| | | | |
|---|---|---|---|
| 9,786,701 B2 | 10/2017 | Mellot et al. | |
| 9,960,295 B2 | 5/2018 | McLeod et al. | |
| 10,367,480 B1 * | 7/2019 | Kreider | H03K 3/017 |
| 10,796,191 B2 | 10/2020 | De Salivet de Fouchecour et al. | |
| 11,320,514 B2 | 5/2022 | Keller et al. | |
| 11,644,553 B2 * | 5/2023 | Shi | G01S 7/4808 |
| | | | 356/5.01 |
| 12,189,063 B2 * | 1/2025 | Ozeki | H03L 7/104 |
| 2017/0115381 A1 | 4/2017 | Moore et al. | |
| 2018/0259645 A1 | 9/2018 | Shu et al. | |
| 2022/0035010 A1 | 2/2022 | Caporale et al. | |

FOREIGN PATENT DOCUMENTS

WO 2017156360 A1 9/2017

* cited by examiner

*Primary Examiner* — An H Do
(74) *Attorney, Agent, or Firm* — Slater Matsil, LLP

(57) ABSTRACT

A method of ranging using a time-of-flight (ToF) ranging system includes: receiving, by a processor, a histogram generated by a ToF imager of the ToF ranging system, where the ToF imager is configured to transmit a light pulse for ranging purpose; finding a rising edge of a pulse region in the histogram, where the pulse region corresponds to a reflected light pulse from a target; fine-tuning a location of the rising edge by performing a fitting process between the rising edge and a pre-stored high-solution rising edge; and calculating an estimate of a distance of the target by adding a pre-determined offset to a distance of the rising edge after fine-tuning the location of the rising edge.

20 Claims, 14 Drawing Sheets

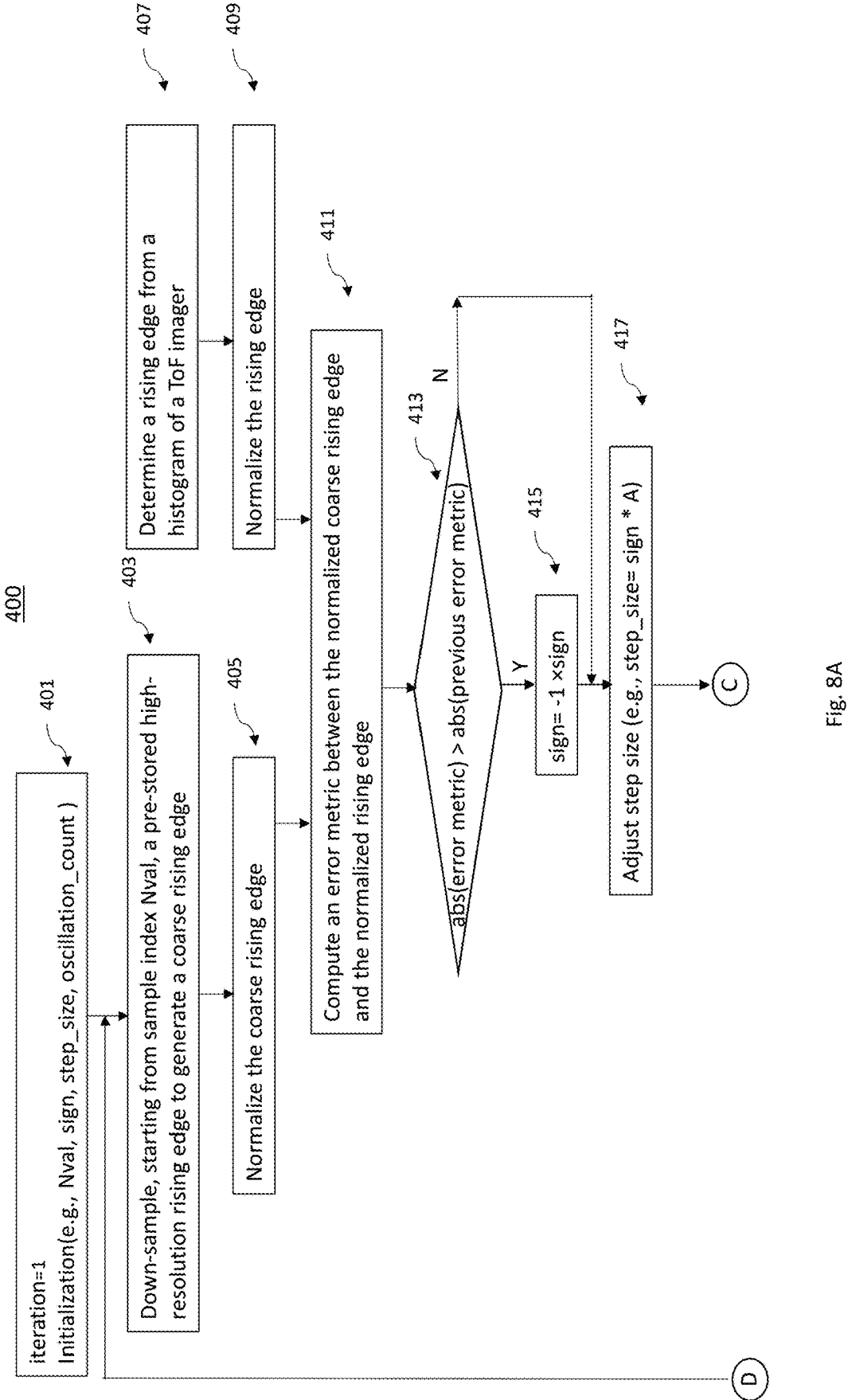

400 iteration=1
Initialization(e.g., Nval, sign, step_size, oscillation_count ) 401

Determine a rising edge from a histogram of a ToF imager 407

Normalize the rising edge 409

Down-sample, starting from sample index Nval, a pre-stored high-resolution rising edge to generate a coarse rising edge 403

Normalize the coarse rising edge 405

Compute an error metric between the normalized coarse rising edge and the normalized rising edge 411 abs(error metric) > abs(previous error metric) 413

N

Y sign= -1×sign 415

Adjust step size (e.g., step_size= sign * A) 417

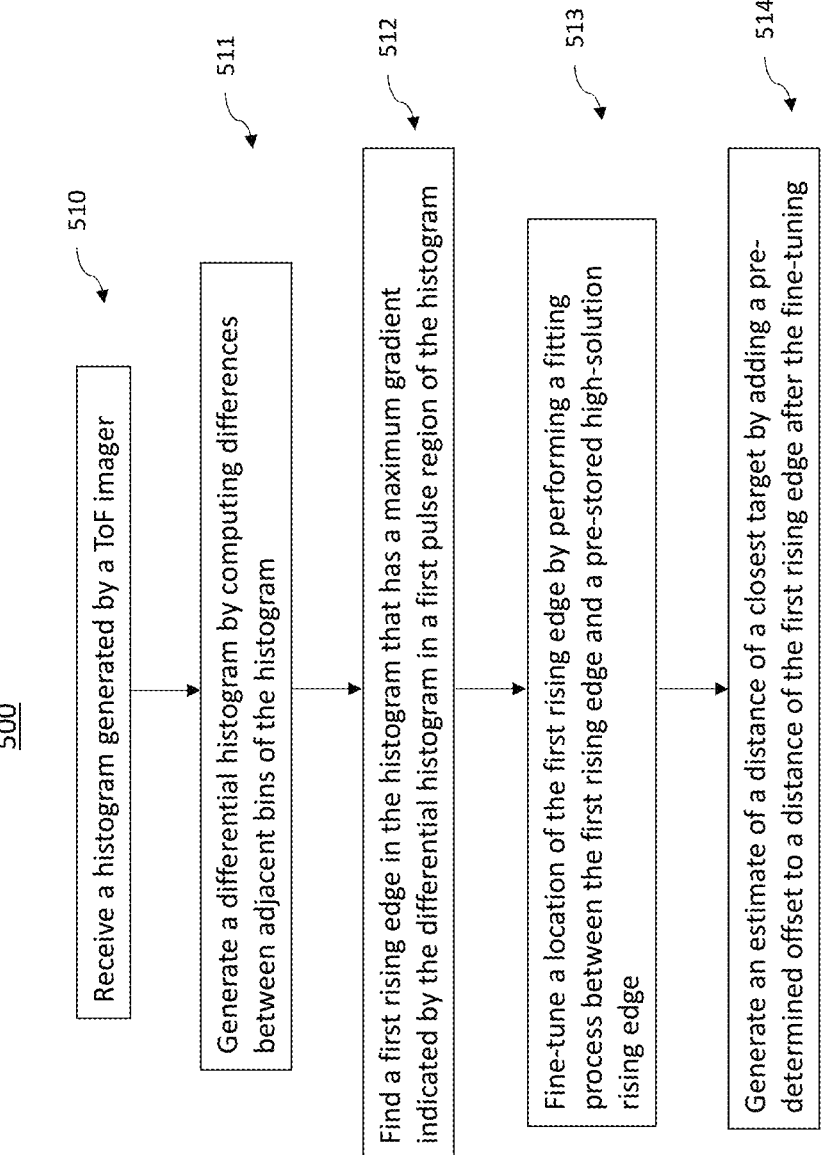

500

510

Receive a histogram generated by a ToF imager

511

Generate a differential histogram by computing differences between adjacent bins of the histogram

512

Find a first rising edge in the histogram that has a maximum gradient indicated by the differential histogram in a first pulse region of the histogram

513

Fine-tune a location of the first rising edge by performing a fitting process between the first rising edge and a pre-stored high-solution rising edge

514

Generate an estimate of a distance of a closest target by adding a pre-determined offset to a distance of the first rising edge after the fine-tuning

Fig. 9

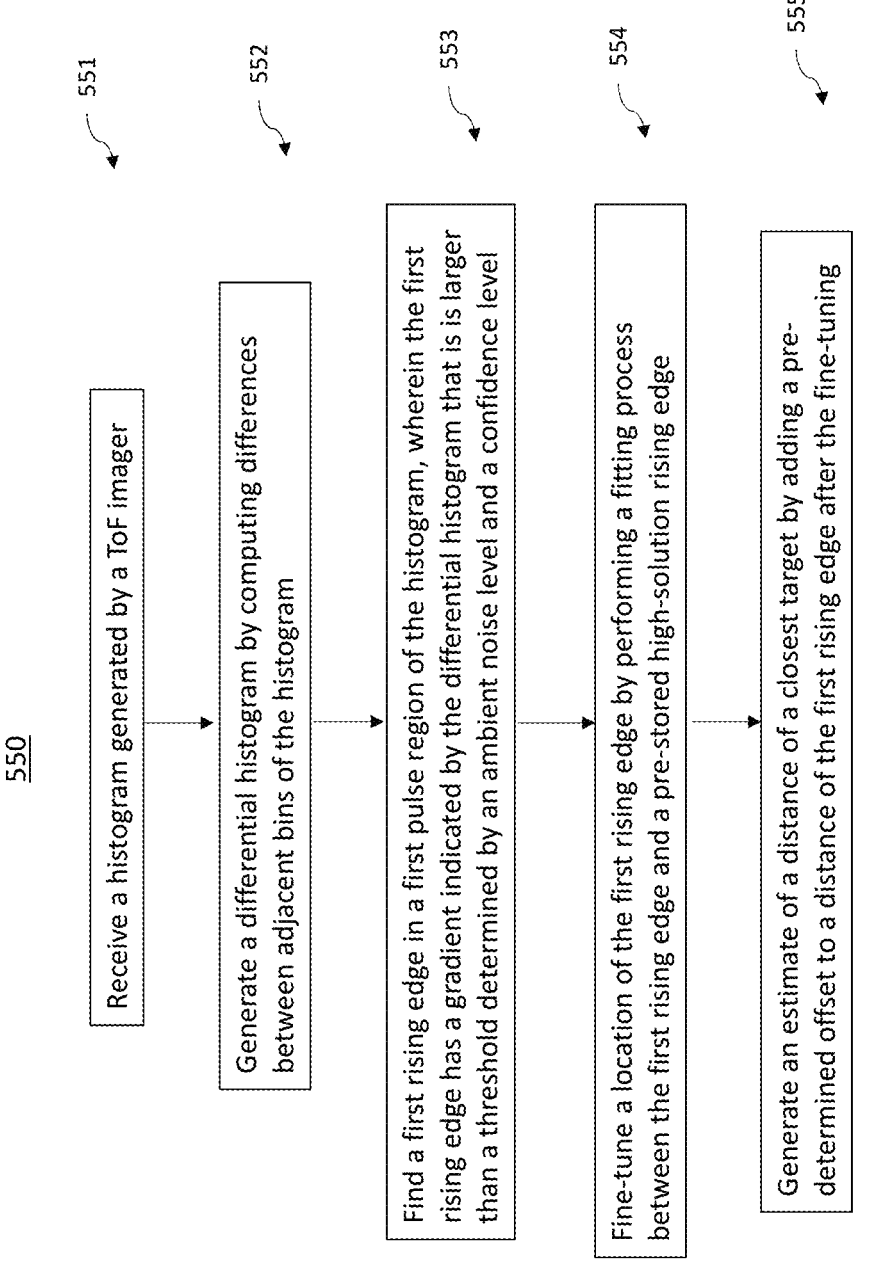

550

551 — Receive a histogram generated by a ToF imager

552 — Generate a differential histogram by computing differences between adjacent bins of the histogram 553 — Find a first rising edge in a first pulse region of the histogram, wherein the first rising edge has a gradient indicated by the differential histogram that is is larger than a threshold determined by an ambient noise level and a confidence level 554 — Fine-tune a location of the first rising edge by performing a fitting process between the first rising edge and a pre-stored high-solution rising edge 555 — Generate an estimate of a distance of a closest target by adding a pre-determined offset to a distance of the first rising edge after the fine-tuning

Fig. 10

TIME-OF-FLIGHT HISTOGRAM SUPER-RESOLUTION SHAPE FITTING

TECHNICAL FIELD

The present invention relates generally to time-of-flight (ToF) ranging systems, and in particular embodiments, to ToF ranging systems capable of measuring the distance of a target (e.g., a closest target, or a furthest target) with immunity to pulse shape distortion.

BACKGROUND

Time-of-flight (ToF) imagers (also referred to as ToF sensors) have been widely used recently for various applications, such as gesture/facial recognition, light detection and ranging (LiDAR), virtual reality, augmented reality, and autonomous robotics. A ToF ranging system uses a ToF imager to measure the distance of an object (e.g., a target). To measure an object, the ToF ranging system instructs the ToF sensor to send a light signal (e.g., light pulses) towards the object and measures the time taken by the signal to travel to the object and back.

Single photon avalanche diode (SPAD) may be used as a detector of reflected light. In some applications, an array of SPADs is provided as a sensor (e.g., an SPAD array) in order to detect a reflected light pulse. A reflected photon may generate a carrier in the SPAD through the photo electric effect. The photon-generated carrier may trigger an avalanche current in one or more of the SPADs in an SPAD array. The avalanche current may signal an event, namely that a photon has been detected. Information related to the reflected intensity, also referred to as "signal count," is output as histograms of the SPAD array. The histogram for each SPAD includes a plurality of histogram bins, where each histogram bin corresponds to a distance (or a narrow range of distance) from the SPAD array, and the value (e.g., signal count) of each histogram bin corresponds to the number of detected avalanche current events (e.g., number of detected photons).

The histogram from the SPAD needs to be processed to extract useful information, such as the number of targets detected, the distances of the targets, and so on. Challenges remain in the processing of the histogram. For example, when the received light pulse shape is distorted and no longer resembles the transmitted light pulse shape (e.g., transmitted by the ToF sensor), and/or when the reflected light pulses from multiple targets merge together, detecting the distance of the target(s) may be difficult. In addition, the processing of histogram is usually computationally intensive and is often performed by an off-chip processor that is located in a different semiconductor die from the semiconductor die having the SPAD array. Efficient processing for the histogram of the SPAD is needed to reduce computational complexity and to enable higher-level of integration for ToF imagers and/or ToF ranging systems.

SUMMARY

In an embodiment, a method of ranging using a time-of-flight (ToF) ranging system includes: receiving, by a processor, a histogram generated by a ToF imager of the ToF ranging system, wherein the ToF imager is configured to transmit a light pulse for ranging purpose; finding a rising edge of a pulse region in the histogram, wherein the pulse region corresponds to a reflected light pulse from a target; fine-tuning a location of the rising edge by performing a fitting process between the rising edge and a pre-stored high-solution rising edge; and calculating an estimate of a distance of the target by adding a pre-determined offset to a distance of the rising edge after fine-tuning the location of the rising edge.

In an embodiment, a method of operating a time-of-flight (ToF) ranging system includes: transmitting, by an emitter of the ToF ranging system, a light signal toward one or more targets; receiving, by a ToF sensor of the ToF ranging system, the light signal reflected by the one or more targets; generating a histogram based on the received light signal; estimating gradients of histogram bins of the histogram by computing differences between adjacent histogram bins of the histogram; identifying a location of a rising edge of the histogram by finding a histogram bin of the histogram, wherein the histogram bin of the histogram has a gradient larger than a pre-determined threshold or has a maximum gradient of a pulse region of the histogram; fine-tuning the location of the rising edge by performing a fitting process between the rising edge and a high-resolution rising edge, wherein the high-resolution rising edge corresponds to a rising edge of a high-resolution histogram of a light pulse transmitted by the emitter, wherein a timing resolution of the high-resolution histogram is higher than that of the histogram; and computing an estimate of a distance of a target by adding a pre-determined offset to a distance of the histogram bin.

In an embodiment, a time-of-flight (ToF) ranging system includes: a light source configured to transmit light pulses for illuminating one or more targets; a ToF sensor configured to receive reflected light pulses from the one or more targets and to generate a histogram based on the reflected light pulses; and a processor configured to: finding a location of a rising edge in the histogram that corresponds to a rising edge of a reflected light pulse reflected by a target; fine-tuning the location of the rising edge by performing a fitting process between the rising edge in the histogram and a pre-stored high-solution rising edge, wherein the pre-stored high-solution rising edge corresponds to a rising edge of a high-solution histogram of a transmitted light pulse from the light source; and calculating an estimate of a distance of the target by adding a pre-determined offset to a distance of the rising edge in the histogram after the fine-tuning.

BRIEF DESCRIPTION OF THE DRAWINGS

The details of one or more embodiments of the invention are set forth in the accompanying drawings and the description below. Other features, objects, and advantages of the invention will be apparent from the description and drawings, and from the claims. In the figures, the same or similar reference symbols generally designate the same or similar component parts throughout the various figures, which will generally not be re-described in the interest of brevity. For a more complete understanding of the invention, reference is now made to the following descriptions taken in conjunction with the accompanying drawings, in which:

FIGS. 8A and 8B together illustrate a method of performing a fitting process between a rising edge and a high-resolution rising edge, in an embodiment;

FIG. 9 illustrates a method of estimating the distance of a closest target, in an embodiment;

FIG. 10 illustrates a method of estimating the distance of a closest target, in another embodiment;

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described in the context of time-of-flight (ToF) ranging systems, and in particular embodiments, to ToF ranging system capable of estimating the distance of a closest target with pulse distortion immunity.

Figure 1:
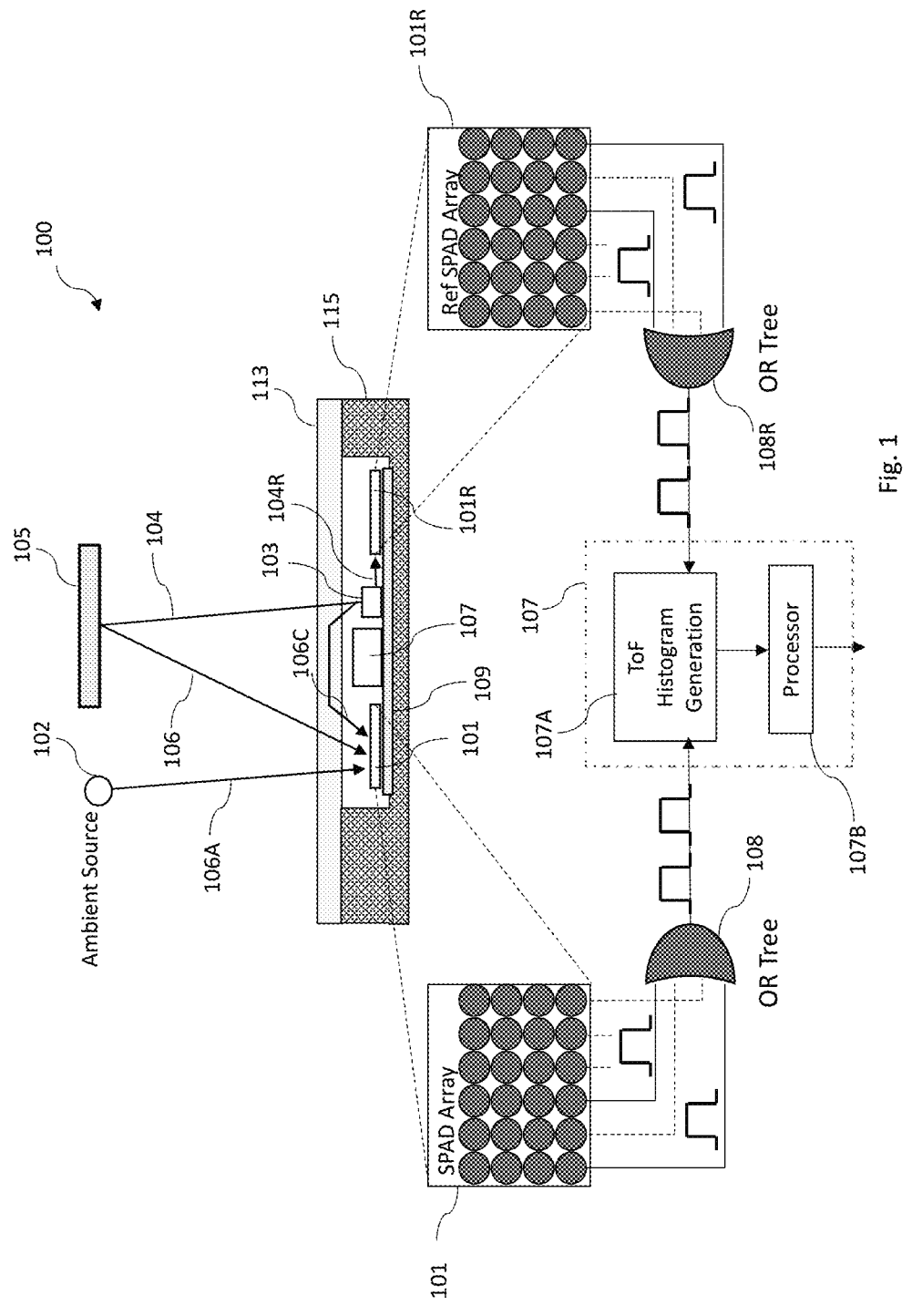
FIG. 1 illustrates a time-of-flight (ToF) ranging system, in an embodiment.

FIG. 1 illustrates a time-of-flight (ToF) ranging system 100, in an embodiment. Note that for simplicity, not all features of the ToF ranging system 100 are illustrated. In addition, to facilitate discussion, FIG. 1 illustrates an object 105 (e.g., a target) and an ambient source 102, with the understanding that the object 105 and the ambient source 102 are not part of the ToF ranging system 100. The upper portion of FIG. 1 illustrates the cross-sectional view of the ToF ranging system 100, while the lower portion of FIG. 1 illustrates details of some components of the ToF ranging system 100, such as the top views of SPAD array 101 and reference SPAD array 101R, the output pulses (e.g., indicating avalanche current events) generated by the SPADs in the SPAD array 101 and the reference SPAD array 101R, the OR trees used to combine the output pulses, and details of processing unit 107.

As illustrated in FIG. 1, the ToF ranging system 100 includes a SPAD array 101, a reference SPAD array 101R, a light source 103 (also referred to as an emitter), and a processing unit 107 attached to a substrate 109 (e.g., a printed circuit board (PCB), an interposer, or the like). FIG. 1 further illustrates an assembly housing 115 (e.g., a protective case, a box, a shell, or the like). The SPAD array 101, the reference SPAD array 101R, the light source 103, the processing unit 107, and the substrate 109 are located inside a space surrounded by the assembly housing 115. A cover glass 113 is attached to upper surfaces of the sidewalls of the assembly housing 115, thereby forming an enclosed space to protect the components disposed within the space. The attachment of the cover glass 113 to the assembly housing 115 shown in FIG. 1 is merely a non-limiting example. The cover glass 113 may be attached by any suitable method.

The light source 103 is a circuit configured to generate a light signal 104 for illuminating an object 105 (e.g., a target). The light source 103 may be, e.g., a vertical-cavity surface-emitting laser (VCSEL) device, a light-emitting diode (LED), an infra-red (IR) device, or the like. The light signal 104 may include a plurality of light pulses. The reflected light signal 106 from the object 105 is received by the SPAD array 101. The SPAD array 101 includes a plurality of SPADs arranged in, e.g., rows and columns. In the example of FIG. 1, the reference SPAD array 101R receives a reference light signal 104R from the light source 103, and provides a reference SPAD output. The reference SPAD output and the SPAD output (e.g., output of the SPAD array 101) are sent to a ToF histogram generation circuit 107A to generate a histogram (also referred to as a ToF histogram). Methods for generating a histogram using a SPAD array and a reference SPAD array are known in the art, details are not repeated. For example, US20170115381 discloses circuits and methods for generating histogram using a SPAD array and a reference SPAD array. US20170115381 is incorporated by reference herein.

In the example of FIG. 1, the ToF histogram generation circuit 107A is part of the processing unit 107. The processing unit 107 also includes a processor 107B, which receives and processes the histogram. The processor 107B may be, e.g., a micro-controller, a digital signal processor (DSP), an Application-Specific Integrated Circuit (ASIC), or the like. The processor 107B processes the histogram to extract useful information, such as number of target(s) in the histogram, the distance of each target, and so on. In an example embodiment, the processor 107B is configured to execute one or more of the methods disclosed hereinafter to estimate the distance of a closest target (e.g., a target having a shortest distance from the ToF ranging system 100). In some embodiments, the ToF histogram generation circuit 107A and the processor 107B are integrated together in a same semiconductor die (e.g., as a single integrated-circuit (IC) die). In other embodiments, the ToF histogram generation circuit 107A and the processor 107B are formed in different (e.g., separate) semiconductor dies. These and other variations are fully intended to be included within the scope of the present disclosure.

FIG. 1 illustrates a cross-talk signal 106C, which represents light signal reflected by the cover glass 113 and received by the SPAD array 101. Cross-talk signal detection and removal from the histogram is known in the art, details are not discussed here. The methods discussed herein assume that the histogram being processed for detecting the target is free or substantially free of cross-talk signal, which may be achieved by removing the cross-talk signal from the histogram using methods known and used in the art.

The components used for emitting light signals, receiving reflected light signals, and generating the histogram, which includes the light source 103, the SPAD array 101, the reference SPAD array 101R, and the ToF histogram generation circuit 107A, are collectively referred to as an ToF imager (also referred to as a ToF sensor), in some embodiments. Therefore, the ToF ranging system 100 includes the ToF imager and the processor 107B, and the processor 107B processes the histogram generated by the ToF imager.

FIG. 1 illustrates the light source 103, the SPAD array 101, the reference SPAD array 101R, and the processing unit 107 as separate components attached to the substrate 109. This is merely a non-limiting example. In some embodiments, the light source 103, the SPAD array 101, the reference SPAD array 101R, and the ToF histogram generation circuit 107A are integrated into a single IC die as an integrated ToF imager. In some embodiments, the light source 103, the SPAD array 101, the reference SPAD array 101R, the ToF histogram generation circuit 107A, and the processor 107B are integrated into a single IC die as an integrated ToF ranging system. These and other variations are fully intended to be included within the scope of the present disclosure.

Figure 2:
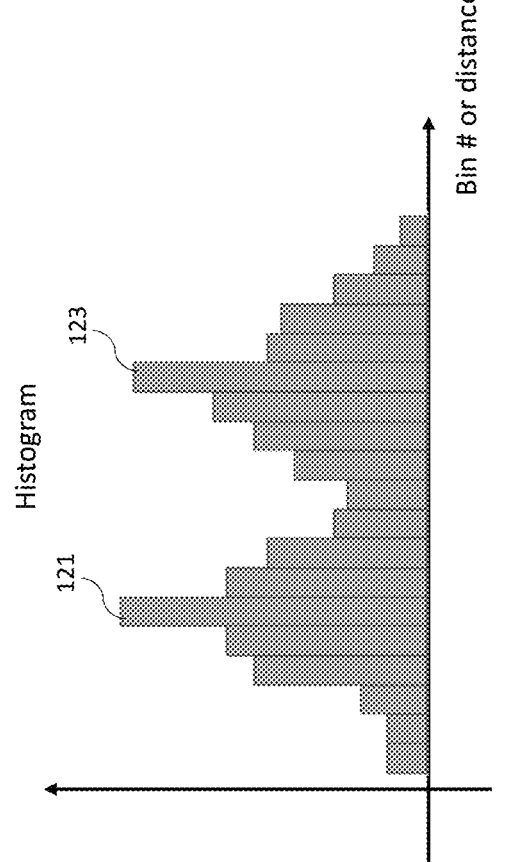
FIG. 2 illustrates a histogram generated by a ToF imager, in an embodiment.

FIG. 2 illustrates a histogram generated by a ToF imager, in an embodiment. The histogram in the example of FIG. 2 has a plurality of bins (also referred to as histogram bins). The value of each bin (e.g., along y-axis) of the histogram represents the signal count within a duration (e.g., a fixed duration) of the bin. The location (e.g., along x-axis), or the index number, of each bin of the histogram corresponds to a distance (or a narrow range of distance) from the SPAD array 101. During histogram processing, when a target is identified as being located in a histogram bin, the distance of that histogram bin is used as the distance of the target (e.g., distance between the SPAD array 101 and the target). In the discussion herein, it is assumed that the light source 103 and the SPAD array 101 are co-located such that the distance between the SPAD array 101 and the target is considered the same as the distance between the light source 103 and the target.

For ease of discussion, each bin of the histogram is assigned a distance (e.g., a distance corresponding to the center of the bin), and the distance corresponding to a bin is also referred to as the distance of the bin, or bin distance. The index of the bin, also referred to as bin index or bin number, may be used to indicate the distance of the bin. For example, assuming that the first bin (e.g., the leftmost bin, or the earliest bin) of the histogram has an index of 1, the second bin has an index of 2, and so on, then the distance of the i-th bin may be calculated as $((i-1)+0.5)D$, where D is the distance traveled by the light signal during a duration that is equal to half of a time interval T, and the time interval T is the duration of a histogram bin. The time interval T is also referred to as bin time width, and the distance D is also referred to as the bin width. Note that the time interval T represents a round-trip time of the light signal. In the example of FIG. 2, the histogram includes two peaks 121 and 123, which may be caused by two targets located at different distances from the ToF imager.

Figure 3:
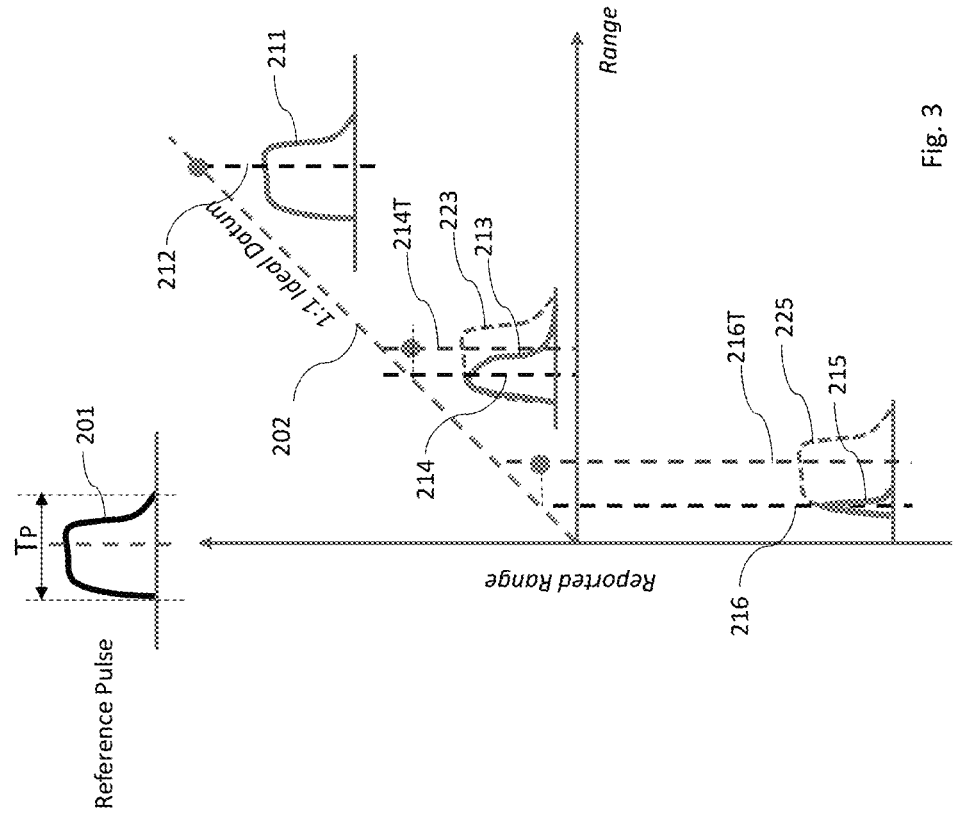
FIG. 3 illustrates challenges in target distance estimation due to limitation in the receiver bandwidth, in some embodiments.

FIG. 3 illustrates challenges in target distance estimation due to limitation in the receiver bandwidth, in some embodiments. In FIG. 3, the x-axis represents range (e.g., distance) of the target, and the y-axis represents the reported range by a reference ToF ranging system. The reference ToF ranging system is a ToF ranging system without using the disclosed methods herein, and serves as a performance comparison to the ToF ranging systems (or methods) disclosed herein.

In the example of FIG. 3, the distance of a single target is being determined by the reference ToF ranging system. A reference pulse shape 201 is illustrated in FIG. 3, which represents the shape of the light pulse transmitted by the ToF imager. FIG. 3 further illustrates three histograms 211, 213, and 215, which are the histograms of the reflected light signal when the target is at a long distance (e.g., 1000 mm away), a short distance (e.g., 100 mm away), and a very close distance (e.g., 10 mm away), respectively. Note that in FIG. 3, the histograms 211, 213, and 215 are illustrated as curves instead of bars, which curves are the envelopes of the respective bar-shaped histograms, as skilled artisans readily appreciate. In addition, in each of the histograms 211, 213, and 215, only the portion of the histogram containing the pulse (also referred to as a received pulse region) corresponding to reflection from the target is shown, and other portions of the histogram, such as portions containing random noise (e.g., shot noise) are plotted as a flat line (e.g., having a zero value) for simplicity.

To determine the distance of the target, the reference ranging system identifies the received pulse region of the histogram, finds the histogram bin in which the median position of the received pulse region falls, and reports the bin distance of the histogram bin found above as the distance of the target. Here, the median position of the received pulse region refers to a position that has an equal number of signal events (e.g., avalanche current events) before and after, and may be determined (e.g., approximated) as the middle point between the starting and ending positions of the received pulse region of the histogram.

As illustrated in FIG. 3, when the target is at a long distance, a small portion of the transmitted light signal is reflected back, and the reflected photons from the target arrives at the ToF sensor at a low rate. As a result, the bandwidth of the SPAD array is not a limiting factor for detecting the reflected photons. Therefore, the shape of the histogram 211 is substantially the same as the reference pulse shape 201. In other words, there is little or no distortion between the reference pulse shape 201 and the shape of the received pulse region of the histogram 211. In this rather ideal case, the distance of the median position (indicated by the dashed line 212) of the received pulse region gives an accurate estimate of the distance of the target, as indicated by the dot on the dashed line 212. Note that the dot is also on the dashed line 202 having a 45-degree angle, which represents the ideal output of Y=X.

When the target is at a short distance, the reflected photons arrive at a faster rate. The bandwidth of the SPAD array may limit the detection of the photons. For example, if two photons arrive at a SPAD at two different time instants separated by a duration smaller than the deadtime of the SPAD, the first photon may be detected, while the second photon may not be detected due to the deadtime of the SPAD after the first photon is detected. Effects of the bandwidth the SPAD array are discussed hereinafter in more detail with reference to FIG. 5.

Due to the limited receiver bandwidth of the SPAD array, the shape of the received pulse region of the histogram 213 is distorted compared with the reference pulse shape 201. In some embodiments, the received pulse region of the histogram 213 has a shorter width compared with an ideal received pulse shape 223 (which is the same as the reference pulse shape 201), which ideal received pulse shape 223 is illustrated in dashed line. The median position of the received pulse region of the histogram 213, as illustrated by the dashed line 214, corresponds to a distance that is smaller than the distance of the median position (illustrated by the dashed line 214T) of the ideal received pulse shape 223. In other words, for short distance ranging, the reference ToF ranging system underestimates the distance of the target. The estimated distance generated by the reference ToF ranging system is indicated by the dot on the dashed line 214T, which is below the 45-degree angled dashed line 202 representing the ideal (e.g., correct) distance estimation.

When the target is at a very close distance, the reflected photons arrive at an even faster rate. The bandwidth of the SPAD array may further limit the detection of the reflected photons, resulting even more distortion in the received pulse region of the histogram 215. The corresponding ideal received pulse shape 225 is illustrated in dashed lines. The median positions of the pulse region of the histogram 215 and the ideal received pulse shape 225 are illustrated by dashed lines 216 and 216T respectively. In this case, the reference ToF ranging system may seriously underestimate the target distance, which is shown as the dot on the dashed line 216T. Note that the vertical distance between the dot on the dashed line 216T and the 45-degree angled dashed line 202 is larger than the vertical distance between the dot on the dashed line 214T and the dashed line 202.

Note that although the bandwidth limitation of the SPAD array may distort the received pulse shape (e.g., shape of the received pulse region of the histogram), the rising edge of the received pulse region of the histogram 213 (or 215) still overlaps with (e.g., is the same as) the respective rising edge of the ideal received pulse shape. In other words, the location (e.g., bin index) of the rising edge of the received pulse region is not affected by the distortion in the received pulse region. This important observation of characteristics is utilized in the methods disclosed herein to estimate the distance of a closest target with immunity to pulse shape distortion. The methods disclosed herein overcome the various challenges faced by the reference ToF ranging system. Details are discussed hereinafter.

Figure 4:
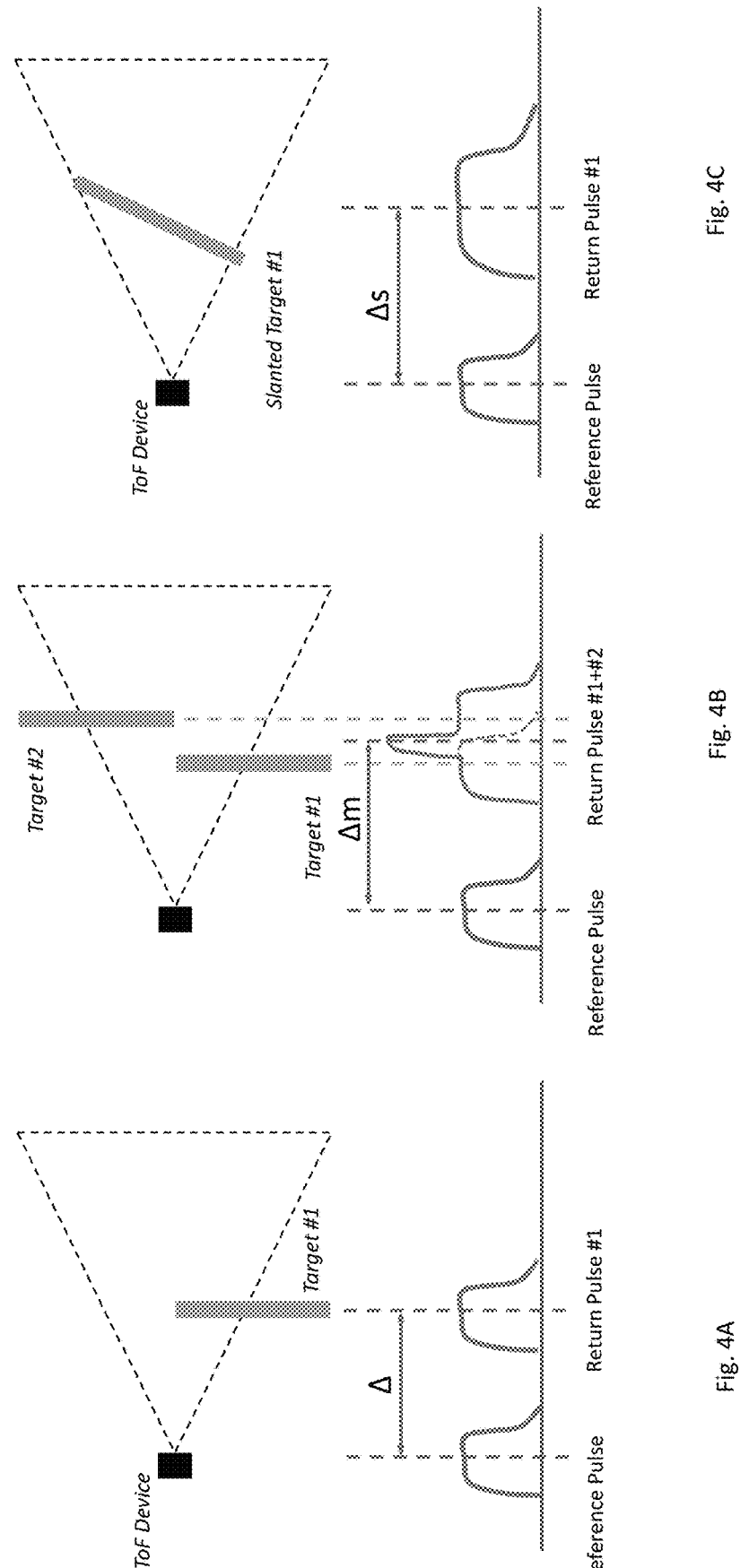
FIGS. 4A-4C illustrate challenges in target distance estimation, in other embodiments.

FIGS. 4A-4C illustrate challenges in target distance estimation, in other embodiments. FIG. 4A illustrates a baseline scenario with a single target, where a ToF device (e.g., a ToF imager or ToF ranging system) transmits a light signal toward the single target and generates a histogram based on the reflected light signal. The transmitted light pulse and the received pulse region of the histogram are shown in FIG. 4A and labeled as "Reference Pulse" and "Return Pulse #1," respectively. The distance (e.g., measured in millimeters or meters) of the median position of the Return Pulse #1, which is proportional to the time difference Δ between the median position of the Reference Pulse and the median position of the Return Pulse #1, gives an accurate estimate of the distance of the single target.

In FIG. 4B, two targets labeled as "Target #1" and "Target #2" are closely spaced. The reflected light pulses from both targets merge to form a merged received pulse region in the histogram, which is labeled as "Return Pulse #1+#2." The distance of the median position of the merged received pulse region, which is proportional to the time difference $\Delta_m$ between the median position of the Reference Pulse and the median position of the merged received pulse region, may give a distance estimate somewhere between Target #1 and Target #2. This means that the reference ToF ranging system may not be able to distinguish the two targets, and the estimated distance of target is not an accurate estimate of either target's distance. While it is possible to develop algorithms to distinguish the two targets contained in the histogram and estimate the distance of each target separately, such algorithms are typically complex, and may be difficult to be implemented in hardware or as software algorithms. However, in many applications, only the distance of the closest target is of interest. For such applications, it may be advantageous to develop simple algorithms that give accurate estimate of the distance of the closest target, such simple algorithms may be easily implemented in hardware or as software, and may reduce the power consumption of the implementation.

In FIG. 4C, there is only one target, but the target is slanted such that different portions of the target are at different distances from the ToF device. As a result, the histogram may include a received pulse region (labeled as "Return Pulse #1" in FIG. 4C) that is longer than the reference pulse shape. The distance estimate based on the median position of the Return Pulse #1 may more or less give the middle point of the target. However, in many applications, only the closest point of the slanted target is of interest.

In both FIGS. 4B and 4C, although the number of targets and the position of the target(s) distort the received pulse shape, the shape and the location of the rising edge of the merged received pulse region in FIG. 4B (or the stretched received pulse region in FIG. 4C) remain unchanged from that of the ideal received pulse shape. This observation is consistent with that of FIG. 3. As discussed hereinafter, based on these observations, the rising edge in a first received pulse region of the histogram is identified and used to get an estimate of the distance of the closest target.

Figure 5:
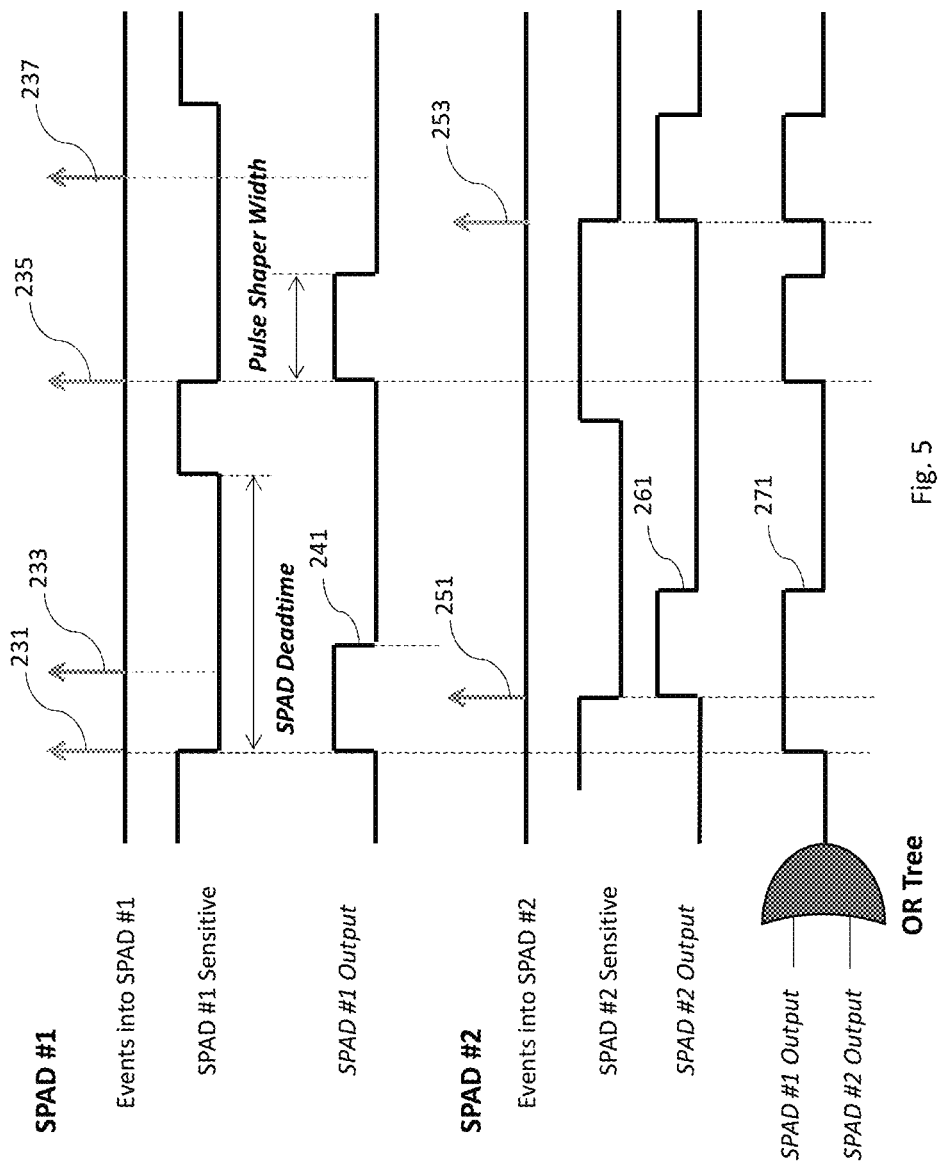
FIG. 5 illustrates the pile-up issue in a SPAD array, in some embodiments.

FIG. 5 illustrates the pile-up issue in a SPAD array, in some embodiments. Pile-up occurs due to the deadtime of the SPADs in the SPAD array, and/or due to the structure (e.g., the OR tree used in) the SPAD array. In FIG. 5, two SPADs (labeled as "SPAD #1" and "SPAD #2") in a SPAD array are illustrated. For SPAD #1, a plurality of reflected photons arrive at time instants 231, 233, 235, and 237, which time instants are shown as arrows. The SPAD #1 is sensitive (e.g., ready to detect photon) prior to time instant 231, as indicated by the logic high state of the signal labeled as "SPAD #1 Sensitive." At time instant 231, a photon arrives and causes an avalanche current event, and the SPAD #1 generates an output pulse 241 in the SPAD output signal labeled as "SPAD #1 Output". One skilled in the art will readily appreciate that after an avalanche current event happens in a SPAD, the SPAD is not able to detect photon for a period of time, which period of time is referred to as the deadtime of the SPAD. The deadtime is illustrated by the logic low state of the SPAD #1 Sensitive signal. Note that the photon arriving at time instant 233 falls within the deadtime of the SPAD #1, and therefore, is not detected and does not generate a SPAD output. The photon arriving at time instant 235 is outside the previous deadtime of the SPAD #1, and therefore, generates a SPAD output (e.g., a pulse in SPAD #1 Output signal). The photon arriving at time instant 237 is inside the previous deadtime of the SPAD #1, and therefore, does not generate a SPAD output.

For the SPAD #2, two photons arrive at time instants 251 and 253 that are separated by a duration longer than the deadtime of the SPAD #2, and therefore, each of the photons generates an output pulse in the SPAD #2 Output signal.

FIG. 5 further illustrates an OR tree in the SPAD array, which OR tree includes one or more logic OR gates that perform the logic OR operation on outputs from all of the SPADs in a SPAD array. The output of the OR tree is used as the output of the SPAD array, in some embodiments. Note that the output pulse 241 from SPAD #1 overlaps in time with the output pulse 261 from SPAD #2, and as a result, the two output pulses 241 and 261 are merged together by the OR tree to form a merged pulse 271 that is longer than output pulses 241 and 261. It may be worth noting that histogram readouts typically detect rising edges of the pulses, and therefore, only one event is recorded from this elongated pulse comprised of two merged SPAD pulses.

As discussed above, the deadtime of the SPADs and the OR tree in the SPAD array may cause some photons to be missed (e.g., not detected or counted), and may cause distortion of the output pulses of the SPADs. This is referred to as the pile-up issue. Pile-up may distort the received pulse shape in the histogram, and may cause challenges for target detection and/or target distance estimation for ToF ranging systems. The currently disclosed ToF ranging system 100, by using the various methods disclosed herein, can overcome the pile-up issue and generate accurate estimates for the distance of the closest target.

Various embodiment methods are discussed below that generate estimate of the distance of a closest target. These embodiments are merely non-limiting examples. Note that the principle of the disclosed methods may also be used to estimate the distance of a furthest target (e.g., the last target in a cluster of targets, or the target that is furthest from the ToF ranging system). In addition, in scenarios where multiple targets result in multiple (e.g., distinct, or separate) pulse regions in the histogram, the principle disclosed herein may be used to estimate the distance of each of the multiple targets. Details are discussed hereinafter.

In some embodiments, the processing of the various methods may include the following steps. First, a rising edge in the histogram that corresponds to the rising edge of a reflected light pulse from the closest target is identified. For ease of discussion, the rising edge in the histogram that corresponds to the rising edge of a reflected light pulse from the closest target may also be referred to as the anchor rising edge.

The reflected light pulse from a target generates a corresponding received pulse region in the histogram, in some embodiments. The shape of the received pulse region in the histogram may or may not be distorted compared with the shape of the transmitted light pulse. In addition, reflected light pulses from closely spaced targets may merge together, thereby generating a longer pulse region in the histogram. However, as discussed above, the shape and the location of the first (e.g., earliest) rising edge of the received pulse region are not changed even when the overall shape of the received pulse region is distorted for the various reasons discussed above. Note that the rising edge of the first (e.g., earliest) received pulse region of the histogram corresponds to the rising edge of the earliest-arriving reflected light pulse, which earliest-arriving reflected light pulse is reflected from the closest target. Therefore, the rising edge of the first received pulse region of the histogram can be found and used as the anchor rising edge.

The location of the anchor rising edge may be found by different methods. For example, the gradient of the histogram at each histogram bin is calculated, e.g., by computing the differences between adjacent histogram bins and using the computed differences as the gradients of respective histogram bins. The first histogram bin (e.g., the leftmost histogram bin, or the earliest histogram bin) having the maximum gradient value is considered to be the location (e.g., the starting point) of the anchor rising edge, and the distance of the first histogram bin is used as the distance of the anchor rising edge. As another example, the gradient of the histogram at each bin is calculated, the first histogram bin with a gradient value larger than a pre-determined threshold is considered to be the location (e.g., the starting point) of the anchor rising edge, and the distance of the first histogram bin is used as the distance of the anchor rising edge. The pre-determined threshold may be determined by an ambient noise level and a user-defined confidence level, details of which are discussed hereinafter with reference to FIG. 10.

Next, the location of the anchor rising edge is fine-tuned by performing a fitting process between anchor rising edge and a pre-stored high-resolution rising edge. In a ToF imager, the histogram is quantized to limit memory resources needed to store the histogram and to reduce the complexity of the timing circuitry for quantization. There-fore, although in theory the location of the rising edge for a continuous time signal can be found by, e.g., finding the location having the maximum gradient, in practice, the location is only as precise as the timing resolution of the histogram. For example, for a histogram having a bin time width of 250 ps, the discrete resolution is about R=37.5 mm. Furthermore, the anchor rising edge found in the histogram might be masked or shifted by ambient noise, introducing an uncertainty of roughly ±2R on the initial estimate of the anchor rising edge location. The fitting process discussed below with reference to FIGS. 6, 7, 8A and 8B improves the accuracy of the estimate of the location of the anchor rising edge, details are discussed below.

Figure 7:
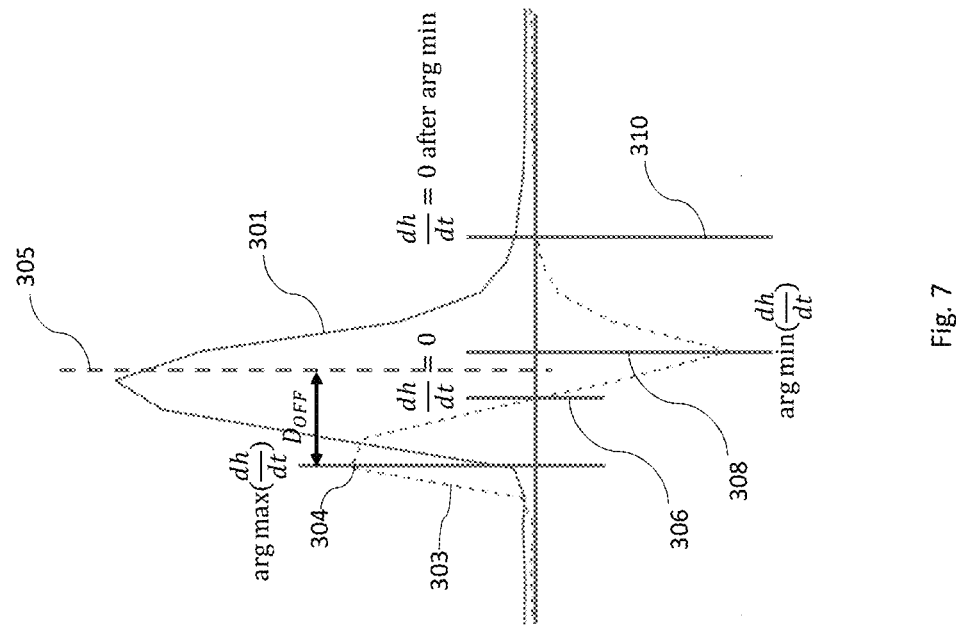
FIG. 7 illustrates a histogram and a corresponding differential histogram, in an embodiment.

After the fitting process to fine-tune the location of the anchor rising edge, a pre-determined offset $D_{OFF}$ is added to the distance of the anchor rising edge to form an estimate of the distance of the closest target. In some embodiments, the pre-determined offset $D_{OFF}$ is half of the transmitted light pulse width (measured in unit of distance). For example, denote the duration of the transmitted light pulse as $T_p$ (see, e.g., duration $T_p$ of the reference pulse shape 201 in FIG. 3), and the speed of light as C, then $D_{OFF}=0.5\times T_p\times C$. In FIG. 7, the location 305 shows an estimated location of the closest target, which is delayed by $D_{OFF}$ from the first rising edge at location 304.

Note that the pre-determined offset $D_{OFF}$ is determined by the shape of the transmitted light pulse produced by the light source 103 (e.g., a VCSEL device), which shape can be characterized (e.g., measured) beforehand, e.g., by a cali-bration process of the light source 103. In some embodi-ments, the pre-determined offset $D_{OFF}$ is determined before-hand, saved, and used later for calculating the distance of the closest target. Note that since the pre-determined offset $D_{OFF}$ is independent of the various factors that distorts the shape of the received pulse region in the histogram, the estimate of the distance of the closest target is robust and is immune to the distortion in the received pulse shape.

In some embodiments, the shape of the transmitted light pulse produced by the light source 103 varies with the temperature of the light source 103. To improve the accuracy of the estimate of the distance of the closest target, the shape of the transmitted light pulse may be characterized (e.g., measured) at a plurality of temperatures (e.g., covering all or a portion of the operating temperature range of the light source 103), and the pre-determined offset $D_{OFF}$ at the different temperatures may be saved, e.g., in a look-up table (LUT). During operation of the ToF ranging system, the present temperature of the light source 103 is determined, and the pre-determined offset $D_{OFF}$ at the present tempera-ture may be determined using the stored values of the pre-determined offset $D_{OFF}$. For example, a simple LUT method finds a temperature in the LUT that is closest to the present temperature, and uses the corresponding stored pre-determined offset $D_{OFF}$ as the pre-determined offset $D_{OFF}$ at the present temperature. As another example, an interpolation (e.g., liner interpolation) may be performed using the stored values of the pre-determined offset $D_{OFF}$ at different temperatures to generate an interpolated value for the pre-determined offset $D_{OFF}$ at the present temperature.

Figure 6:
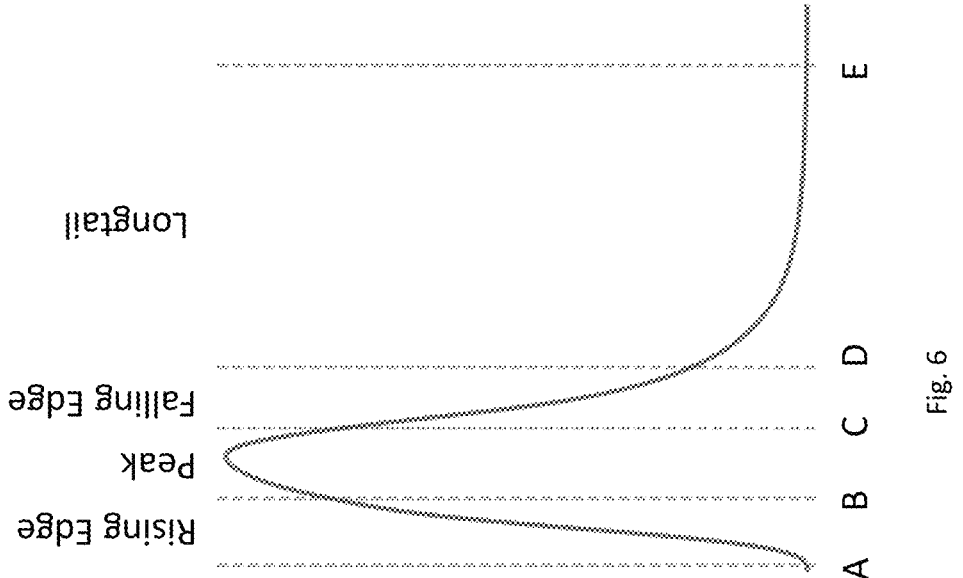
FIG. 6 illustrates a histogram of a transmitted pulse by a ToF imager, in an embodiment.

FIG. 6 illustrates a histogram of a transmitted pulse by a ToF imager, in an embodiment. The histogram of FIG. 6 includes four regions delimited by the vertical dashed lines A, B, C, D, and E. Specifically, the histogram includes a rising edge region, a peak region, a falling edge region, and a longtail region. For ease of discussion, the rising edge region, the peak region, the falling edge region, and the longtail region may also be referred to as the rising edge, the peak, the falling edge, and the longtail, respectively. As discussed above, pile-up can severely distort the peak region, the falling edge region, and the longtail region. The longtail region may be dependent on the peak region, and the peak region may be high variable in terms of magnitude. The various regions shown in FIG. 6 may be determined using the example method illustrated in FIG. 7.

In embodiments where there is a plurality of targets at different distances from the ToF ranging system, the histogram may include multiple pulse regions, which pulse regions may or may not merge together. However, the rising edge of the first pulse region in the histogram, which corresponds to reflection from the first target (e.g., the closest target), is not affected by the subsequent targets. Therefore, the rising edge of the first pulse region in the histogram may be used to find the location of the first target (e.g., the closest target) in the plurality of targets.

In addition, where multiple targets result in multiple (e.g., distinct, or separate) pulse regions in the histogram, the principle disclosed herein may be used to estimate the distance of each of the multiple targets, e.g., by finding the location of the rising edge of each pulse region in the histogram, performing the fitting process described herein for each rising edge to fine-tune the location of each rising edge, and adding a pre-determined offset to the distance of each rising edge after the fine-tuning. In cases where a cluster of closely spaced targets cause their corresponding pulse regions in the histogram to merge together and form a merged pulse region in the histogram, the rising edge of the merge pulse region may still be used to estimate the distance of the first target in the cluster of closely spaced targets, using the principle disclosed herein.

Note that the falling edge of the last pulse region in the histogram, which corresponds to reflection from the last target (e.g., the target furthest from the ToF ranging system, also referred to as the furthest target) in the plurality of targets, is also quite robust against various factors distorting the return pulse shape. Therefore, the falling edge of the last pulse region in the histogram may be used to determine the location of the last target in the plurality of targets. For example, once the falling edge of the last pulse region in the histogram is determined, the location of the last target may be estimated by subtracting the pre-determined offset $D_{OFF}$ from the distance of the falling edge, wherein the distance of the falling edge is the distance of the bin that contains the starting point of the falling edge, shown by the dashed line C in FIG. 6. In addition, the location of the falling edge may be fined-tuned by performing a fitting process between the falling edge and a pre-stored high-resolution falling edge. A fitting process between the rising edge and a pre-stored high-resolution rising edge is described in details hereinafter. One skilled in the art, once reading the disclosure herein, should be able to easily adapt the disclosed fitting process for the falling edge. The distance between the rising edge and the falling edge may be used to determine the width of a pulse region in the histogram, and may be used to determine whether the pulse region corresponds to a single target, or is a merged pulse region corresponding to multiple targets.

FIG. 7 illustrates a histogram 301 and a corresponding differential histogram 303 (shown in dashed line), in an embodiment. In some embodiments, the differential histogram 303 is generated by computing differences between adjacent bins of the histogram 301. The computed differences are assigned to respective bins of the differential histogram. For example, denote the value of the i-th bin of the histogram as H(i), and denote the value for the i-th bin of the differential histogram as DH(i), then DH(i) may be calculated as DH(i)=H(i)–H(i–1). In some embodiments, assuming the index of the histogram bins starts from 1, a zero value is assigned to DH(1), such that the differential histogram has the same length (e.g., same number of histogram bins) as the histogram, and there is a one-to-one correspondence between the histogram bins of the histogram and the histogram bins (also referred to as bins) of the differential histogram. The value DH(i) of the i-th bin of the differential histogram is an approximation of (e.g., proportional to) the gradient of the histogram at the i-th bin of the histogram, and therefore, is used as the gradient of the i-th bin H(i) of the histogram in the discussed herein.

Still referring to FIG. 7, denote the maximum value and the minimum value of the differential histogram as DH_MaxVal and DH_MinVal, respectively, the first histogram bin (e.g., the leftmost histogram bin at location 304) of the histogram having the maximum value DH_MaxVal is considered as the starting point of the rising edge region, and is used as a coarse estimate of the location of the rising edge, in an embodiment. Denote the index of the first histogram bin of the histogram having the maximum gradient value DH_MaxVal as start_ind, the rising edge region includes a total of M histogram bins in the histogram, starting from bin index start_ind. The number M may be, e.g., 4, 5, 6, or the like, depending on the transmitted pulse width and the bin time width. As mentioned previously and will be discussed in more details hereinafter, the starting point (e.g., bin index start_ind) of the rising edge region may also be determined by finding the first histogram bin (e.g., the leftmost histogram bin) of the histogram having a gradient value larger than a pre-determined threshold.

The histogram in FIG. 7 has a maximum value at location 306, and the corresponding differential histogram has a zero value (or near zero value due to quantization in the histogram). At location 308, the differential histogram has the smallest value DH_MinVal, which indicates the starting point of the falling edge region. The peak region is between the location 308 and the end of the rising edge region. At location 310, the differential histogram has the first zero value (or near zero value) after the location 308. The location 310 indicates the end of the falling edge region and the beginning of the longtail region.

As discussed above, the index start_ind indicates the location (e.g., starting point) of the rising edge. Since the histogram generated in ToF ranging systems generally have limited timing resolution in order to reduce memory requirement and the complexity of the timing circuitry for histogram generation, the index start_ind only provides a coarse estimate of the location of the rising edge. The coarse estimate can be improved by a fitting process that fits the rising edge with a pre-stored high-resolution rising edge, details are discussed below.

In some embodiments, the pre-stored high-resolution rising edge is a portion (e.g., a beginning portion) of a pre-stored high-resolution histogram. The pre-stored high-resolution histogram is a histogram of the transmitted pulse of the ToF emitter 103, and is produced, e.g., by a calibration process where the transmitted pulse (see, e.g., the reference pulse shape 201 in FIG. 3) from the ToF emitter 103 is reflected by a single target with little or no ambient noise. In other words, the pre-stored high-resolution histogram represents an ideal histogram of the reference pulse shape 201 in FIG. 3, and may closely resemble the reference pulse shape 201. Notably, the pre-stored high-resolution histogram is generated at a higher sampling frequency than that of the histogram generated during normal operation of the ToF ranging system 100, such that a higher timing resolution is achieved. After being generated, the pre-stored high-resolution histogram is stored, e.g., in a memory region of the ToF ranging system 100 for later use. For ease of discussion, the pre-stored high-resolution histogram may also be referred to as the high-resolution histogram. In some embodiments, when only the rising edge of the high-resolution histogram is used in the fitting process, the beginning portions of the high-resolution histogram (e.g., portions containing the rising edge) is stored and other portions are not stored to save memory space. Note that the high-resolution histogram may be analyzed and processed before being used by the ToF ranging system 100, such that the boundaries (e.g., bin indexes) for each region (e.g., rising edge region, falling edge region, peak region) of the high-resolution histogram are determined and used later (e.g., for the fitting process).

In the illustrated embodiments, the timing resolution of the high-resolution histogram is N times that of the histogram generated by the ToF ranging system 100. In other words, each histogram bin of the histogram of the ToF ranging system 100 corresponds to N adjacent histogram bins of the high-resolution histogram, and therefore, each of the N adjacent histogram bins of the high-resolution histogram corresponds to one of N subphases (e.g., a time phase) of the histogram bin of the ToF ranging system 100. For example, if the first rising edge (e.g., the anchor rising edge) of the histogram has M histogram bins, then the corresponding high-resolution rising edge has M×N histogram bins. The number N may be any suitable number, such as 4, 8, 10, 20, or more.

In some embodiments, a high-level description of the fitting process between the first rising edge and the high-resolution rising edge may be described as the following: down-sample the high-resolution rising edge by a factor of N at each of the N subphases to generate N coarse rising edges, where each of the N coarse rising edges corresponds to one of the N subphases. In other words, perform the down-sampling of the high-resolution rising edge N times, each time starting from a different bin index (e.g., 1, 2, . . . , N) to generate the N coarse rising edges. Consider an example where N=4, down-sampling the high-resolution rising edge starting from bin index 1 generates a coarse rising edge that includes bins 1, 5, 9, . . . and so on, of the high-resolution rising edge; and down-sampling the high-resolution rising edge starting from bin index 2 generates another coarse rising edge that includes bins 2, 6, 10, . . . and so on, of the high-resolution rising edge. In the above example with N=4, there are four subphases for each of the histogram bin, and each of the four coarse rising edges generated by the down-sampling corresponds to one of the four subphases.

Next, an error metric is computed for each of the coarse rising edges. Denote the first rising edge (e.g., anchor rising edge) and the n-th coarse rising edge as RisingEdge and RisingEdgeCoarse_n, respectively, where n=1, 2, . . . , N, then the error metric between the first rising edge and the n-th coarse rising edge, denoted as ErrorMetric(n) may be calculated as:

$$ErrorMetric(n) = \sum_{m=1}^{M} abs(RisingEdge(m) - \text{RisingEdgeCoarse\_n}(m)) \quad (1)$$

where M is the number of histogram bins in the first rising edge, and function abs( ) give the absolute value (e.g., magnitude) of the input variable.

Next, the minimum value of the error metric values ErrorMetric(n) is found, and the index of the minimum error metric value is used to provide an adjustment term to the coarse estimate of the location of the first rising edge. For example, if ErrorMetric(k) has the minimum value, and bin index start_ind of the histogram is the coarse estimate of the location of the first rising edge, then the updated (e.g., adjusted, or fine-tuned) location of the first rising edge is given by start_ind+k/N. Therefore, the fitting process provides a fractional adjustment to the coarse estimate to improve the accuracy of the estimated location of the first rising edge.

The fitting process described above illustrates the high-level details. For real implementation, more consideration is needed for the fitting process. For example, the starting point of the first rising edge determined from the histogram and the starting point of the high-resolution rising edge may not be perfectly aligned (e.g., may be off by one or more histogram bins to either side). Therefore, the fitting process may need to search for the best starting bin index (which corresponds to the best subphase that gives the minimum error metric) for down-sampling of the high-resolution rising edge around an initial bin index in both directions. As another example, the amplitude of the reflected pulse shape may change due to channel conditions, and therefore, to compute the error metric correctly, a normalization process may be performed for the first rising edge and the coarse rising edge. This may be achieved by, e.g., scaling the first rising edge and the coarse rising edge such that at a specific bin location (e.g., the fourth bin of the rising edge and the fourth bin of the coarse rising edge), the first rising edge and the coarse rising edge has a same value (e.g., a unit value of 1) after the normalization. As yet another example, the down-sampling may be performed more than N times, due to the search around the initial bin index to find the best starting bin index for down-sampling. An example method for performing the fitting process is discussed below with reference to FIGS. 8A and 8B.

Figure 8B:
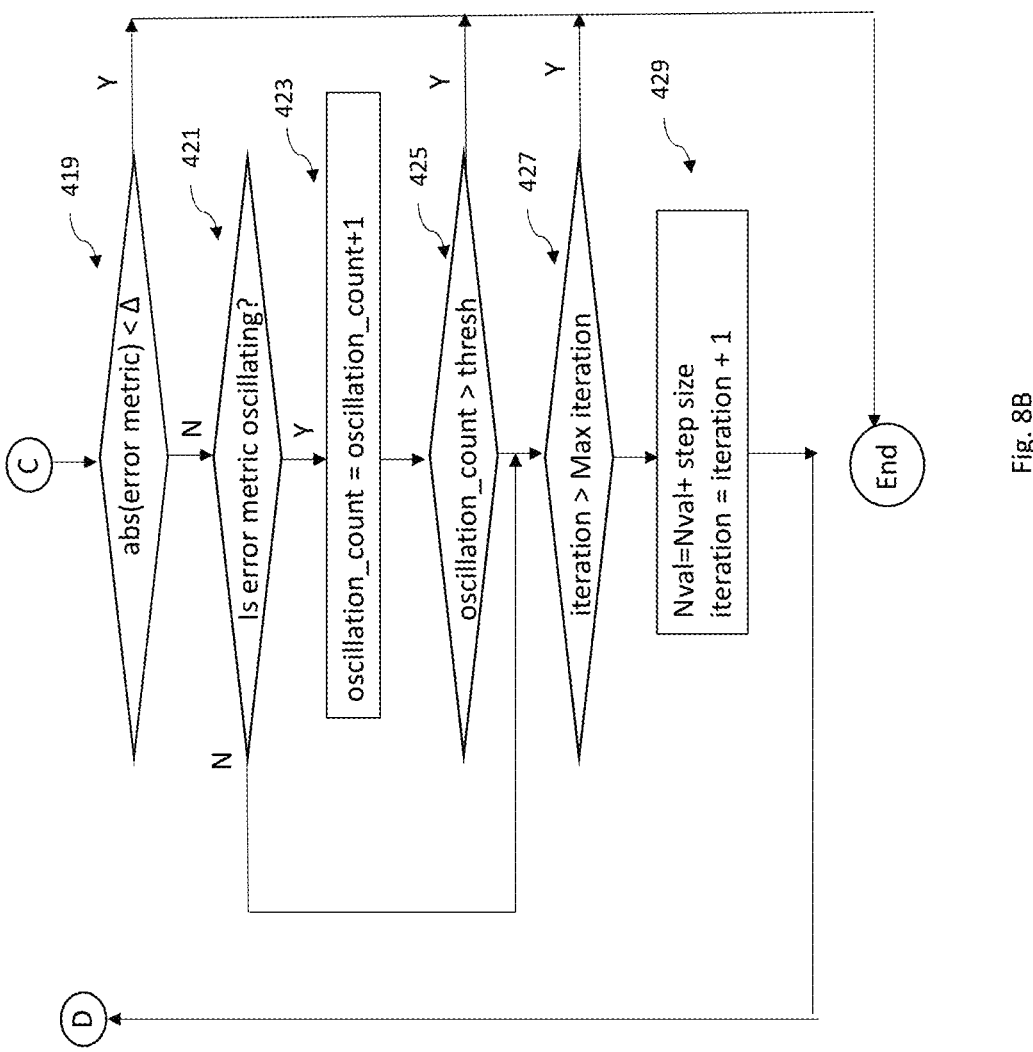

FIGS. 8A and 8B together illustrate a method 400 of performing a fitting process between a rising edge of a histogram and a pre-stored high-resolution rising edge, in an embodiment. It should be understood that the embodiment method shown in FIGS. 8A and 8B is merely an example of many possible embodiment methods. One of ordinary skill in the art would recognize many variations, alternatives, and modifications. For example, various steps as illustrated in FIGS. 8A and 8B may be added, removed, replaced, rearranged, or repeated.

Referring to FIGS. 8A and 8B, at block 401, an initialization process is performed. For example, an iteration index iteration is initialized to a value of 1. A value Nval, which indicates the subphase that achieves the smallest error metric during the fitting process, is initialized to 1. A value sign, which indicates the direction of search for the best starting bin index used for down-sampling, is initialized to a value of, e.g., 1. A value step_size, which indicates the step size of the change in the starting bin index during the search for the best starting bin index, is initialized to 1. A value oscillation_count, which tracks the number of oscillations in the values of the error metrics during the search for the best staring bin index, is initialized to 0.

At block 407, a rising edge (e.g., the anchor rising edge) of the histogram is determined, e.g., by finding the bin index start_ind. Details are discussed above, thus not repeated. The rising edge region includes a total of M histogram bins in the histogram, starting from bin index start_ind. The starting point of the rising edge region may be found by finding the first histogram bin with the maximum gradient value, or by finding the first histogram bin having a gradient value larger than a pre-determined threshold, as discussed above. The rising edge is then normalized at block 409. The normalization process is discussed above, details are not repeated.

At block 403, the pre-stored high-resolution rising edge is down-sampled by a factor of N, starting from bin index Nval, to generate a coarse rising edge. At block 405, the coarse rising edge is normalized. The normalization process is discussed above, details are not repeated.

At block 411, an error metric between the normalized coarse rising edge and the normalized rising edge is computed, using Equation (1). Note that the normalized coarse rising edge and the normalized rising edge correspond to the coarse rising edge and the rising edge in Equation (1), respectively, during the computation.

At block 413, the computed error metric is compared with the error metric computed during the previous iteration (referred to as the previous error metric). The previous error metric may be initialized (e.g., in block 401) with a large value (e.g., 100, or 1000), which large value is larger than a largest value expected for the error metric. If the computed error metric is larger than the previous error metric, this means that the searching of the best starting bin index is going in the wrong direction. Therefore, the processing goes to block 415, where the value sign is inverted (e.g., changed from 1 to −1, or vice versa), such that the searching of the best starting bin index for down-sampling will continue along an opposite direction of the current searching direction. After the processing of block 415, the processing continues to block 417. If, however, the computed error metric is smaller than the previous error metric, processing goes directly from block 413 to block 417.

At block 417, the step size step_size is adjusted to speed up the searching process. In some embodiments, the computed error metric is compared with a threshold. If the computed error metric is above the threshold, this may indicate that the current starting index bin is far away from the best starting index bin, so the value step_size is scaled by a value A, where A is an integer value larger than one, such as 2. If the computed error metric is below the threshold, no adjustment for the step size is needed. In some embodiments, the processing in block 417 is omitted.

Next, at block 419, the computed error metric is compared with a threshold A, which threshold A has a smaller value (e.g., 0.1, 0.01, 0.001, or smaller). If the computed error metric is smaller than A, the current starting bin index is considered to be close enough to the best starting bin index, and the searching process (e.g., the iterations) for the best bin index is stopped. If the computed error metric is larger than A, processing continues to block 421.

At block 421, the method checks if the searching process (e.g., searching for the best bin index) is oscillating around a same position. An oscillation occurs if the current error metric calculated during the i-th iteration is equal to the error metric computed during the (i−2)-th iteration. If no oscillation occurs during the current iteration, the processing goes to block 427. If an oscillation occurs, the processing goes to block 423. At block 423, the value oscillation_count is incremented by 1, then processing goes to block 425. At block 425, the value oscillation_count is compared with a threshold value for maximum number of oscillations, and if the value oscillation_count is larger than the maximum number of oscillations allowed, the searching process is stopped; otherwise, the processing goes to block 427.

At block 427, the iteration index iteration is compared with a threshold for maximum number of iterations. If the iteration index iteration is larger than the maximum number of iterations allowed, the searching process stops; otherwise, processing goes to block 429. At block 429, the value Nval is updated by adding the step size step_size (which may be a positive integer value or a negative integer value), and the iteration index iteration is incremented by 1. Next, the processing goes back to block 403 to for another iteration.

After the fitting process in FIGS. 8A and 8B ends, the value Nval represents the best starting bin index for the down-sampling of the pre-stored high-resolution rising edge, and is used to fine-tune the location (indicated by start_ind) of the first rising edge as follows: start_ind=start_ind+Nval/N.

While the fitting process in FIGS. 8A and 8B is illustrated using rising edge as an example, skilled artisans will readily appreciate that the principle of the fitting process may be easily adapted for fitting a falling edge of the histogram with a pre-stored high-resolution falling edge, fitting a peak region of the histogram with a pre-stored high-resolution peak region, or fitting another region of the histogram having a distinctive shape with a corresponding pre-stored high-resolution shape. These and other variations are fully intended to be included within the scope of the present disclosure.

FIG. 9 illustrates a method 500 of estimating the distance of a closest target, in an embodiment. It should be understood that the embodiment method shown in FIG. 9 is merely an example of many possible embodiment methods. One of ordinary skill in the art would recognize many variations, alternatives, and modifications. For example, various steps as illustrated in FIG. 9 may be added, removed, replaced, rearranged, or repeated.

Referring to FIG. 9, at block 510, a histogram generated by a ToF imager is received, e.g., by the processor 107B. At block 511, a differential histogram is generated by computing differences between adjacent bins of the histogram, and assigning the computed differences to respective bins of the differential histogram. Details are discussed above, thus not repeated. Next, at block 512, a first rising edge in a first pulse region (e.g., the leftmost pulse region, or the earliest pulse region) of the histogram having a maximum gradient (indicated by the differential histogram) of the first pulse region is found. In some embodiments, the maximum value of the differential histogram for the pulse region is determined, and the first bin (e.g., leftmost bin) of the pulse region of the histogram having the maximum value is identified. The bin index of the first bin of the histogram is used to indicate the location (or equivalently, the distance) of the first rising edge in the histogram. Next, in block 513, the location of the first rising edge is fine-tuned (e.g., updated, or modified) by performing a fitting process between the first rising edge and a pre-stored high-resolution rising edge, using, e.g., the fitting process disclosed in FIGS. 8A and 8B. Next, in block 514, an estimate of the distance of the closest target is determined by adding a pre-determined offset $D_{OFF}$ to the distance of the first rising edge after the fine-tuning. As discussed above, the pre-determined offset $D_{OFF}$ is determined by the shape of the transmitted light pulse. In addition, temperature compensation for the pre-determined offset $D_{OFF}$ may be performed, e.g., by a LUT method or an interpolation method, to generate the pre-determined offset $D_{OFF}$ for the present temperature of the light source 103.

FIG. 10 illustrates a method 550 of estimating the distance of a closest target, in another embodiment. It should be understood that the embodiment method shown in FIG. 10 is merely an example of many possible embodiment methods. One of ordinary skill in the art would recognize many variations, alternatives, and modifications. For example, various steps as illustrated in FIG. 10 may be added, removed, replaced, rearranged, or repeated.

The processing of the method in FIG. 10 is similar to that of FIG. 9, but the first rising edge is found using a different approach in block 553. In other words, the processing in blocks 551, 552, 554, and 555 are the same as those in blocks 510, 511, 513, and 514, respectively, thus details are not repeated. The processing of block 553 is discussed below.

In block 553, a first rising edge in a first pulse region (e.g., a leftmost pulse region) of the histogram is found, where the first rising edge has a gradient indicated by the differential histogram that is larger than a threshold, which threshold is determined by an ambient noise level and a user-defined confidence level (e.g., a user-defined scale factor). In an embodiment, to find the location of the first rising edge, the values of the bins of the differential histogram are compared with the threshold, and the first bin (e.g., leftmost bin) of the differential histogram having a value larger than the threshold is identified. The bin index of the first bin of the differential histogram is used to indicate the location (or equivalently, the distance) of the first rising edge in the histogram.

As an example, the threshold used in block 553 may be determined as described below. Denote the ambient events (e.g., avalanche current events caused by ambient light signal) per histogram bin as $\sigma^2$, and denote the user-defined confidence level as C, then the threshold TH is calculated as $TH = C \times \sqrt{2 \times \sigma^2}$. Note that in the above calculation, the ambient events per bin of the differential histogram is considered as twice of the ambient noise events per bin of the histogram (due to the subtraction operation used for calculating the differential histogram doubling the power of the ambient events level). The noise from these two bins is then the square root of twice the ambient events per bin due to the shot noise characteristics of light. The ambient noise events per histogram bin may be measured beforehand using a calibration process, or may be measured periodically during operation of the ToF ranging system. The user-defined confidence level C may be adjusted in accordance with the ambient noise level to achieve reliable detection of the first rising edge. For example, the user-defined confidence level C may be increased if the ambient noise level increases, or vice versa, in order to avoid false detection of the first rising edge and to achieve a target detection rate for the first rising edge. Besides the method discussed above, other suitable methods for determining the threshold used in the processing of block 553 are also possible, and are fully intended to be included within the scope of the present disclosure.

The fitting process described above may be used to search for multiple rising edges in the histogram of a ToF ranging system. For example, if there are multiple targets, and the multiple targets are spaced apart far enough such that the pulse regions in the histogram corresponding to reflected pulses from the multiple targets do not merge together, then the rising edge of each pulse region can be found by applying an fitting process, and the distance of each target may be estimated based on the distance of each rising edge (e.g., by adding a pre-determined offset $D_{OFF}$ to the distance of the rising edge). Details are discussed below with reference to FIG. 11.

Figure 11:
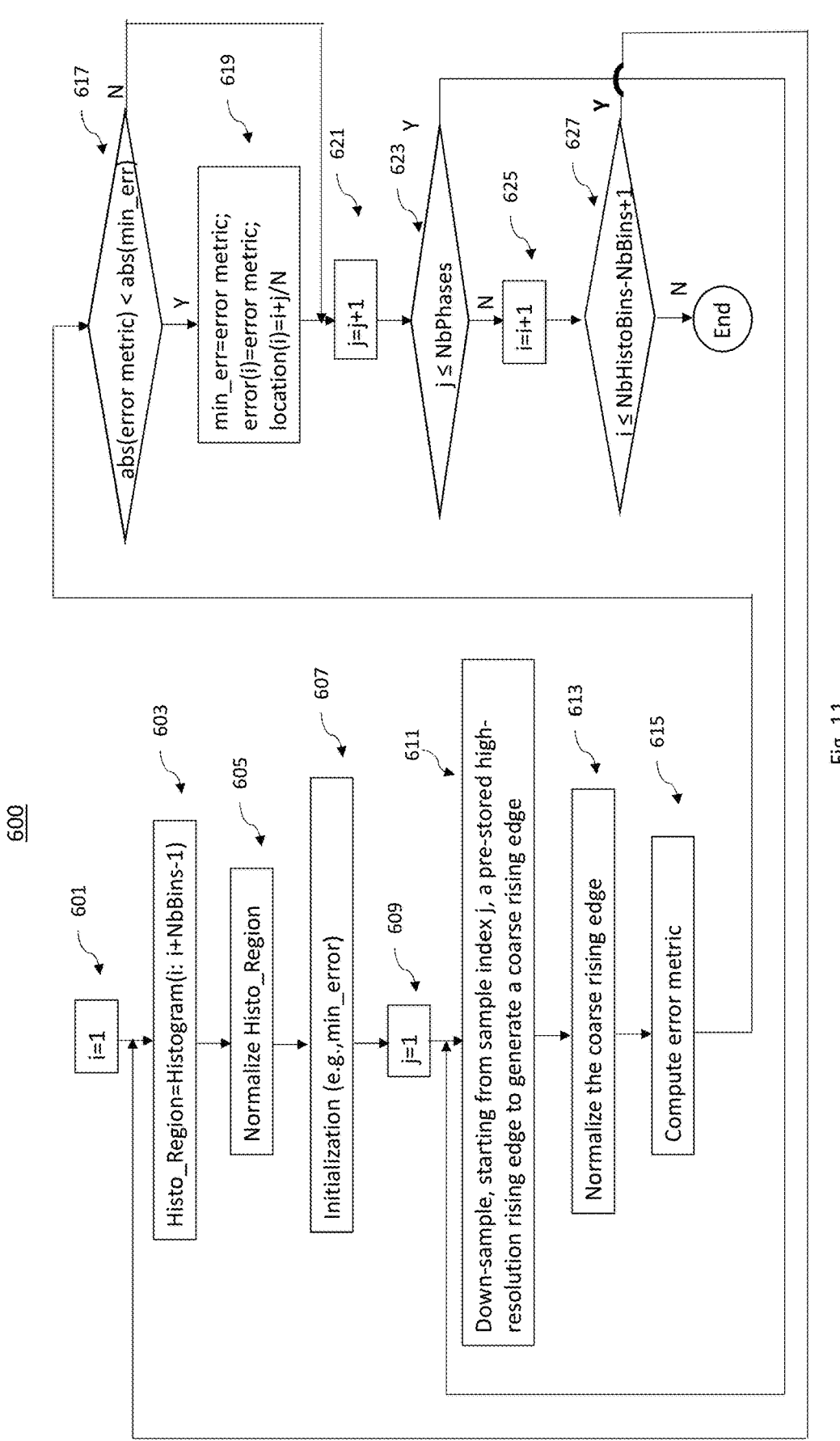
FIG. 11 illustrates a method of finding multiple peaks in a histogram, in an embodiment.

FIG. 11 illustrates a method 600 of finding multiple peaks in a histogram, in an embodiment. It should be understood that the embodiment method shown in FIG. 11 is merely an example of many possible embodiment methods. One of ordinary skill in the art would recognize many variations, alternatives, and modifications. For example, various steps as illustrated in FIG. 11 may be added, removed, replaced, rearranged, or repeated.

Referring to FIG. 11, at block 601, an iteration index i is initialized to 1. At block 603, histogram bins with index from i to i+NbBins−1 are saved in a vector Histo_Region, where NbBins is the number of histogram bins in the rising edge. The vector Histo_Region may potentially be a rising edge. A fitting process is performed subsequently to find the best match between the vector Histo_Region and a pre-stored high-resolution rising edge, and the smallest value of the error metric (e.g., computed using Equation (1)) corresponding to the best match is saved as the fitting error error(i) for the vector Histo_Region during the i-th iteration. Once the fitting error error(i) for all valid values of i are computed, values for index i of the fitting error error(i) having the minimum fitting error (or having a fitting error below a lower threshold) indicate locations of the rising edges, as discussed below.

Next, in block 605, the vector Histo_Region is normalized by a normalization process. For example, the vector Histo_Region is scaled such that a particular bin (e.g., the fourth bin) has a unit value of 1. Next, in block 607, initialization for some variables are performed. For example, a minimum error metric min_error is initialized to a large value (e.g., 100, or 1000).

Next, in block 609, an iteration index j is initialized to 1. In block 611, a pre-stored high-resolution rising edge is down-sampled by a factor of N, starting from sample index j, to generate a coarse rising edge. The pre-stored high-resolution rising edge is described above, thus details are not repeated. The coarse rising edge is normalized in block 613 using a same or similar normalization process as in block 605.

In block 615, an error metric is computed using the Equation (1). In block 617, the computed error metric is compared with the minimum error metric min_error. If the computed error metric is larger than min_error, the processing goes to block 621; otherwise, the processing goes to block 619. In block 619, the minimum error metric min_error is updated with the computed error metric, the fitting error error(i) is assigned the value of the computed error metric, and the i-th element of a vector location, is assigned a value of i+j/N.

In block 621, the iteration index j is incremented by 1. In block 623, the iteration index j is compared with a value NbPhases, which indicates the maximum number of sub-phases to compare. If the iteration index j is smaller than NbPhases, the processing goes back to block 611; otherwise, the processing goes to block 625.

In block 625, the iteration index i is incremented by 1. In block 627, the iteration index i is compared with a maximum value for the iteration index i (e.g., NbHistoBins−NbBins+1), where NbHistoBins is the number of histogram bins in the histogram. If the iteration index i is smaller than NbHistoBins−NbBins+1, the processing goes back to block 603; otherwise, the iterative processing ends. Note that once the iterative processing ends, values of error(i), where i=1, 2, . . . , NbHistoBins−NbBins+1, store the best (e.g., lowest) fitting errors for each of the starting locations i. Denote the minimum value of error(i) as min_err_val, if error(k)= min_err_val, then k indicates a location of a rising edge. Note that there may be multiple elements of error(i) having the minimum fitting error min_err_val. In another embodiment, a lower threshold is determined (e.g., a value close to but higher than the minimum fitting error min_err_val), and if error(k) is smaller than the lower threshold, then k indicates a location of a rising edge. The corresponding value stored in location(k) gives a more accurate location of the rising edge, due to the fractional adjustment provided by j/N.

Figure 12:
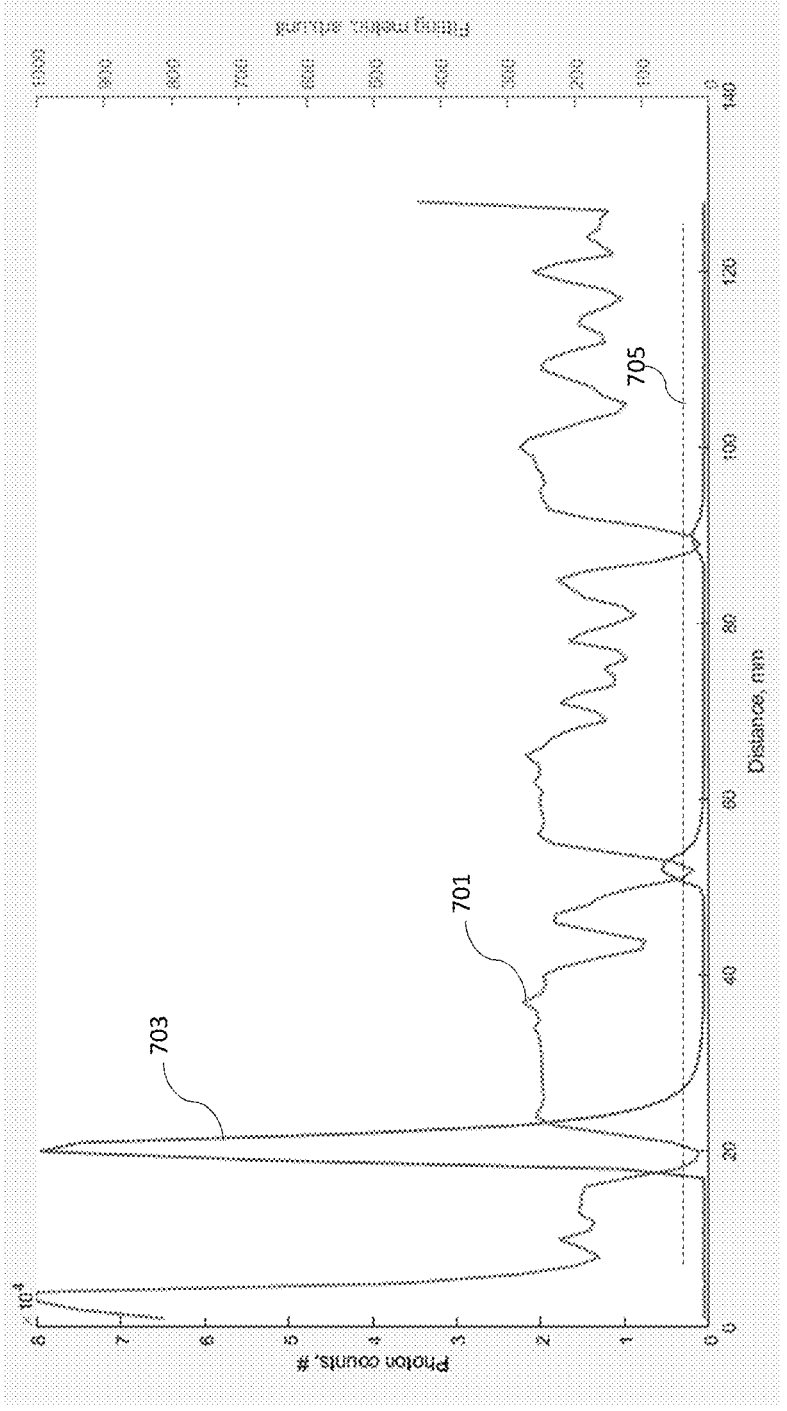
FIG. 12 illustrates the performance of the method of FIG. 11, in an embodiment.

FIG. 12 illustrates the performance of the method of FIG. 11, in an embodiment. In FIG. 12, the curve 703 shows a histogram, and the curve 701 shows the fitting error error(i) for each bin of the histogram 703. By finding locations in curve 701 having the minimum value, or having values lower than a lower threshold (illustrated by the dashed line 705), three rising edges of the three peak regions in the histogram are found.

Figure 13:
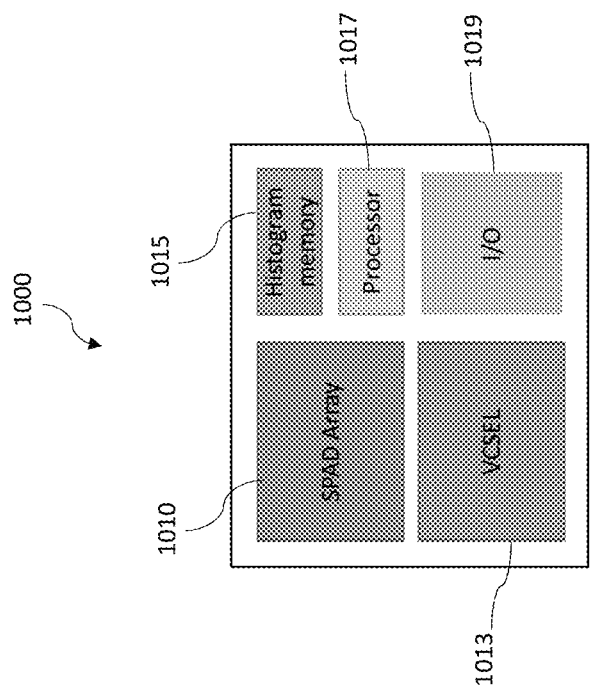
FIG. 13 illustrates an integrated circuit (IC) device formed as a ToF ranging system, in an embodiment.

FIG. 13 illustrates an integrated circuit (IC) device 1000 formed as a ToF ranging system, in an embodiment. The IC device 1000 may be formed as the ToF ranging system 100 of FIG. 1. Note that for simplicity, not all features of the IC device 1000 are illustrated. The IC device 1000 includes a light source 1013 (e.g., a VCSEL, an LED, or the like) and a SPAD array 1010. The light source 1013 may correspond to the light source 103 in FIG. 1. The SPAD array 1010 may correspond to the SPAD array 101 and reference SPAD array 101R in FIG. 1, and may additionally include the ToF histogram generation circuit 107A of FIG. 1.

The IC device 1000 further includes a memory module 1015 for storing the histogram generated by the SPAD array 1010. Notably in FIG. 11, a processor 1017 is integrated in the IC device 1000, which processor 1017 may correspond to the processor 107B in FIG. 1 and may be configured to perform one or more of the methods disclosed herein to generate an estimate of the distance of the target (e.g., a closest target, a furthest target). The IC device 1000 may further include an input/output (I/O) module 1019 for communication with other devices.

Note that the various methods for closest target distance estimation are simple to implement, and require very little computational power. These advantages allow many different types of processors to be easily and economically integrated into the IC device 1000 as the processor 1017, and no off-chip processing of the histogram by another processor is needed. The on-chip processing of the histogram data significantly reduces the chip complexity related to I/O transfer of histogram data to an off-chip processing module, and reduces the processing delay related to off-chip processing.

Disclosed embodiments may achieve advantages. For example, the various disclosed methods provide accurate estimate of the closest target (or furthest target), and is robust against distortions in the received pulse shape. Temperature compensation may be performed to further improve the accuracy of the estimates. The adjustment term provided by the fitting process provides fine adjustment of distance smaller than the bin width. The disclosed methods are simple to implement and saves computational power, and as a result, allows a fully integrated ToF ranging system on a single IC device.

Example embodiments of the present invention are summarized here. Other embodiments can also be understood from the entirety of the specification and the claims filed herein.

Example 1. In an embodiment, a method of ranging using a time-of-flight (ToF) ranging system includes: receiving, by a processor, a histogram generated by a ToF imager of the ToF ranging system, wherein the ToF imager is configured to transmit a light pulse for ranging purpose; finding a rising edge of a pulse region in the histogram, wherein the pulse region corresponds to a reflected light pulse from a target; fine-tuning a location of the rising edge by performing a fitting process between the rising edge and a pre-stored high-solution rising edge; and calculating an estimate of a distance of the target by adding a pre-determined offset to a distance of the rising edge after fine-tuning the location of the rising edge.

Example 2. The method of Example 1, wherein the pre-stored high-solution rising edge corresponds to a rising edge of a high-solution histogram of a transmitted light pulse from the ToF imager, wherein a timing resolution of the high-resolution histogram is N times that of the histogram.

Example 3. The method of Example 2, wherein each histogram bin of the histogram corresponds to N adjacent histogram bins of the high-resolution histogram, the N adjacent histogram bins representing N subphases of each histogram bin, wherein performing the fitting process comprises: down-sampling the pre-stored high-resolution rising edge by a factor of N at each of the N subphases to generate N coarse rising edges; generating N error metrics by computing differences between the rising edge and the N coarse rising edges; and finding a subphase of the N subphases that has a lowest error metric of the N error metrics.

Example 4. The method of Example 3, wherein the location of the rising edge is indicated by an index of a histogram bin of the histogram, wherein fine-tuning the location of the rising edge comprises adjusting the index by a fractional number indicated by the subphase having the lowest error metric.

Example 5. The method of Example 1, further comprising: finding a falling edge in the histogram that corresponds to a falling edge of a reflected light pulse from a furthest target; fine-tuning a location of the falling edge by performing another fitting process between the falling edge and a pre-stored high-solution falling edge; and calculating an estimate of a distance of the furthest target by subtracting another pre-determined offset from a distance of the falling edge after fine-tuning the location of the falling edge.

Example 6. The method of Example 1, wherein finding the rising edge comprises: generating a differential histogram by computing differences between adjacent histogram bins of the histogram and assigning the computed differences as values of respective histogram bins of the differential histogram; and finding a histogram bin in the pulse region of the histogram, wherein a gradient of the histogram bin, indicated by a value of a corresponding histogram bin of the differential histogram, is larger than a pre-determined threshold, or is a maximum value of the gradients of the histogram bins of the histogram in the pulse region.

Example 7. The method of Example 6, wherein the pre-determined threshold is determined by an ambient noise level in the histogram and a user-specified confidence level.

Example 8. The method of Example 6, wherein the pre-determined offset is determined by a shape of the light pulse transmitted by the ToF imager, and corresponds to half of a width of the light pulse.

Example 9. The method of Example 1, further comprising performing a calibration process for the ToF imager, comprising: measuring a shape of the light pulse transmitted by the ToF imager at different temperatures; computing a plurality of values for the pre-determined offset at the different temperatures; and storing the plurality of values for the pre-determined offset at the different temperatures.

Example 10. The method of Example 9, further comprising: obtaining a measurement of a present temperature of the ToF imager; and determining a present value for the pre-determined offset based on the measurement of the present temperature and the stored plurality of values for the pre-determined offset at the different temperatures.

Example 11. In an embodiment, a method of operating a time-of-flight (ToF) ranging system includes: transmitting, by an emitter of the ToF ranging system, a light signal toward one or more targets; receiving, by a ToF sensor of the ToF ranging system, the light signal reflected by the one or more targets; generating a histogram based on the received light signal; estimating gradients of histogram bins of the histogram by computing differences between adjacent his-togram bins of the histogram; identifying a location of a rising edge of the histogram by finding a histogram bin of the histogram, wherein the histogram bin of the histogram has a gradient larger than a pre-determined threshold or has a maximum gradient of a pulse region of the histogram; fine-tuning the location of the rising edge by performing a fitting process between the rising edge and a high-resolution rising edge, wherein the high-resolution rising edge corre-sponds to a rising edge of a high-resolution histogram of a light pulse transmitted by the emitter, wherein a timing resolution of the high-resolution histogram is higher than that of the histogram; and computing an estimate of a distance of a target by adding a pre-determined offset to a distance of the histogram bin.

Example 12. The method of Example 11, wherein the histogram bin is a leftmost histogram bin of the histogram.

Example 13. The method of Example 12, wherein the timing resolution of the high-resolution histogram is N time that of the histogram such that each histogram bin of the histogram corresponds to N adjacent histogram bins of the high-resolution histogram, the N adjacent histogram bins representing N subphases of each histogram bin, wherein performing the fitting process comprises: down-sampling the high-resolution rising edge by a factor of N at each of the N subphases to generate N coarse rising edges; generating N error metrics by computing differences between the rising edge and the N coarse rising edges; and finding a subphase of the N subphases that has a lowest error metric of the N error metrics.

Example 14. The method of Example 13, wherein fine-tuning the location of the rising edge comprises adjusting an index of the histogram bin by an amount indicated by the subphase having the lowest error metric.

Example 15. The method of Example 11, wherein the pre-determined offset is proportional to half of a width of the light pulse transmitted by the emitter.

Example 16. The method of Example 15, wherein the width of the light pulse transmitted by the emitter varies with temperature, wherein the method further comprises adjust-ing the pre-determined offset in accordance with a present temperature of the emitter.

Example 17. In an embodiment, a time-of-flight (ToF) ranging system includes: a light source configured to trans-mit light pulses for illuminating one or more targets; a ToF sensor configured to receive reflected light pulses from the one or more targets and to generate a histogram based on the reflected light pulses; and a processor configured to: finding a location of a rising edge in the histogram that corresponds to a rising edge of a reflected light pulse reflected by a target; fine-tuning the location of the rising edge by performing a fitting process between the rising edge in the histogram and a pre-stored high-solution rising edge, wherein the pre-stored high-solution rising edge corresponds to a rising edge of a high-solution histogram of a transmitted light pulse from the light source; and calculating an estimate of a distance of the target by adding a pre-determined offset to a distance of the rising edge in the histogram after the fine-tuning.

Example 18. The ToF ranging system of Example 17, wherein finding the location of the rising edge comprises: computing differences between adjacent histogram bins of the histogram and assigning the computed differences as gradients of respective histogram bins of the histogram; and finding a first histogram bin in a pulse region of the histogram, wherein the first histogram bin has a first value that is a maximum value of the computed differences in the pulse region, or is larger than a pre-determined threshold value.

Example 19. The ToF ranging system of Example 18, wherein a timing resolution of the high-resolution histogram is N time that of the histogram such that each histogram bin of the histogram corresponds to N adjacent histogram bins of the high-resolution histogram representing N subphases of each histogram bin, wherein performing the fitting pro-cess comprises: down-sampling the pre-stored high-resolu-tion rising edge by a factor of N at each of the N subphases to generate N coarse rising edges; generating N error metrics by computing differences between the rising edge in the histogram and the N coarse rising edges; and finding a subphase of the N subphases that has a lowest error metric of the N error metrics.

Example 20. The ToF ranging system of Example 17, wherein the pre-determined offset is proportional to half of a width of the transmitted light pulse.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of operating a time-of-flight (ToF) ranging system to obtain target locations with an improved timing resolution than a native timing resolution of a histogram generated by a ToF imager of the ToF ranging system, the method comprising:

receiving, by a processor, the histogram generated by the ToF imager of the ToF ranging system, wherein the ToF imager is configured to transmit a light pulse for ranging purposes and to generate the histogram having the native timing resolution;

finding a rising edge of a pulse region in the histogram, wherein the pulse region corresponds to a reflected light pulse from a target;

fine-tuning a location of the rising edge by performing a fitting process between the rising edge and a pre-stored high-resolution rising edge, wherein the fine-tuning adjusts the location of the rising edge by a fraction of a bin width of the histogram to achieve the improved timing resolution for the location of the rising edge, wherein the pre-stored high-resolution rising edge cor-responds to a measured characteristic of a transmitted light pulse from the ToF imager, wherein the pre-stored high-resolution rising edge has a higher timing resolu-tion than the native timing resolution of the histogram;

calculating an estimate of a distance of the target by adding a pre-determined offset to a distance of the rising edge after fine-tuning the location of the rising edge;

outputting the estimate of the distance of the target as a target location, wherein the target location has the improved timing resolution than the native timing resolution of the histogram.

2. The method of claim 1, wherein the pre-stored high-resolution rising edge corresponds to a rising edge of a high-resolution histogram of the transmitted light pulse from the ToF imager, wherein a timing resolution of the high-resolution histogram is N times that of the histogram.

3. The method of claim 2, wherein each histogram bin of the histogram corresponds to N adjacent histogram bins of the high-resolution histogram, the N adjacent histogram bins representing N subphases of each histogram bin, wherein performing the fitting process comprises:

down-sampling the pre-stored high-resolution rising edge by a factor of N at each of the N subphases to generate N coarse rising edges;

generating N error metrics by computing differences between the rising edge and the N coarse rising edges; and finding a subphase of the N subphases that has a lowest error metric of the N error metrics.

4. The method of claim 3, wherein the location of the rising edge is indicated by an index of a histogram bin of the histogram, wherein fine-tuning the location of the rising edge comprises adjusting the index by a fractional number indicated by the subphase having the lowest error metric.

5. The method of claim 1, further comprising:

finding a falling edge in the histogram that corresponds to a falling edge of a reflected light pulse from a furthest target;

fine-tuning a location of the falling edge by performing another fitting process between the falling edge and a pre-stored high-resolution falling edge; and calculating an estimate of a distance of the furthest target by subtracting another pre-determined offset from a distance of the falling edge after fine-tuning the location of the falling edge.

6. The method of claim 1, wherein finding the rising edge comprises:

generating a differential histogram by computing differences between adjacent histogram bins of the histogram and assigning the computed differences as values of respective histogram bins of the differential histogram; and finding a histogram bin in the pulse region of the histogram, wherein a gradient of the histogram bin, indicated by a value of a corresponding histogram bin of the differential histogram, is larger than a pre-determined threshold, or is a maximum value of the gradients of the histogram bins of the histogram in the pulse region.

7. The method of claim 6, wherein the pre-determined threshold is determined by an ambient noise level in the histogram and a user-specified confidence level.

8. The method of claim 6, wherein the pre-determined offset is determined by a shape of the light pulse transmitted by the ToF imager, and corresponds to half of a width of the light pulse.

9. The method of claim 1, further comprising performing a calibration process for the ToF imager, comprising:

measuring a shape of the light pulse transmitted by the ToF imager at different temperatures;

computing a plurality of values for the pre-determined offset at the different temperatures; and storing the plurality of values for the pre-determined offset at the different temperatures.

10. The method of claim 9, further comprising:

obtaining a measurement of a present temperature of the ToF imager; and determining a present value for the pre-determined offset based on the measurement of the present temperature and the stored plurality of values for the pre-determined offset at the different temperatures.

11. A method of operating a time-of-flight (ToF) ranging system to obtain a target location having a timing resolution higher than a native timing resolution of a histogram generated by the ToF ranging system, the method comprising:

transmitting, by an emitter of the ToF ranging system, a light signal toward one or more targets;

receiving, by a ToF sensor of the ToF ranging system, the light signal reflected by the one or more targets;

generating, by a histogram generation circuit of the ToF ranging system, a histogram based on the received light signal, wherein the histogram has a first timing resolution;

estimating gradients of histogram bins of the histogram by computing differences between adjacent histogram bins of the histogram;

identifying a location of a rising edge of the histogram by finding a histogram bin of the histogram, wherein the histogram bin of the histogram has a gradient larger than a pre-determined threshold or has a maximum gradient of a pulse region of the histogram;

fine-tuning the location of the rising edge by performing a fitting process between the rising edge and a high-resolution rising edge, wherein the fine-tuning adjusts the location of the rising edge by a fraction of a bin width of the histogram bin to achieve a second timing resolution for the location of the rising edge, wherein the second timing resolution is higher than the first timing resolution, wherein the high-resolution rising edge corresponds to a rising edge of a high-resolution histogram of a light pulse transmitted by the emitter, wherein a timing resolution of the high-resolution histogram is higher than that of the histogram; and computing an estimate of a distance of a target by adding a pre-determined offset to a distance of the histogram bin.

12. The method of claim 11, wherein the histogram bin is a leftmost histogram bin of the histogram having the gradient larger than the pre-determined threshold or having the maximum gradient of the pulse region of the histogram.

13. The method of claim 12, wherein the timing resolution of the high-resolution histogram is N times that of the histogram such that each histogram bin of the histogram corresponds to N adjacent histogram bins of the high-resolution histogram, the N adjacent histogram bins representing N subphases of each histogram bin, wherein performing the fitting process comprises:

down-sampling the high-resolution rising edge by a factor of N at each of the N subphases to generate N coarse rising edges;

generating N error metrics by computing differences between the rising edge and the N coarse rising edges; and finding a subphase of the N subphases that has a lowest error metric of the N error metrics.

14. The method of claim 13, wherein fine-tuning the location of the rising edge comprises adjusting an index of the histogram bin by an amount indicated by the subphase having the lowest error metric.

15. The method of claim 11, wherein the pre-determined offset is proportional to half of a width of the light pulse transmitted by the emitter.

16. The method of claim 15, wherein the width of the light pulse transmitted by the emitter varies with temperature, wherein the method further comprises adjusting the pre-determined offset in accordance with a present temperature of the emitter.

17. A time-of-flight (ToF) ranging system with improved accuracy in target distance measurement, the ToF ranging system comprising:

a light source configured to transmit light pulses for illuminating one or more targets;

a ToF sensor configured to receive reflected light pulses from the one or more targets and to generate a histogram based on the reflected light pulses, wherein the histogram has a first timing resolution; and a processor configured to:

find a location of a rising edge in the histogram that corresponds to a rising edge of a reflected light pulse reflected by a target;

fine-tune the location of the rising edge by performing a fitting process between the rising edge in the histogram and a pre-stored high-resolution rising edge, wherein the fine-tuning adjusts the location of the rising edge by a fraction of a bin width of the histogram to achieve a second timing resolution for the location of the rising edge, wherein the second timing resolution is higher than the first timing resolution, wherein the pre-stored high-resolution rising edge corresponds to a rising edge of a high-resolution histogram of a transmitted light pulse from the light source; and calculate an estimate of a distance of the target by adding a pre-determined offset to a distance of the rising edge in the histogram after the fine-tuning.

18. The ToF ranging system of claim 17, wherein the processor is configured to find the location of the rising edge by:

computing differences between adjacent histogram bins of the histogram and assigning the computed differences as gradients of respective histogram bins of the histogram; and finding a first histogram bin in a pulse region of the histogram, wherein the first histogram bin has a first value that is a maximum value of the computed differences in the pulse region, or is larger than a pre-determined threshold value.

19. The ToF ranging system of claim 18, wherein a timing resolution of the high-resolution histogram is N times that of the histogram such that each histogram bin of the histogram corresponds to N adjacent histogram bins of the high-resolution histogram representing N subphases of each histogram bin, wherein performing the fitting process comprises:

down-sampling the pre-stored high-resolution rising edge by a factor of N at each of the N subphases to generate N coarse rising edges;

generating N error metrics by computing differences between the rising edge in the histogram and the N coarse rising edges; and finding a subphase of the N subphases that has a lowest error metric of the N error metrics.

20. The ToF ranging system of claim 17, wherein the pre-determined offset is proportional to half of a width of the transmitted light pulse.

\* \* \* \* \*